United States Patent
Cross

(10) Patent No.: US 12,446,717 B2
(45) Date of Patent: Oct. 21, 2025

(54) UTENSILS HAVING INWARDLY CURVING AND PERPENDICULAR SCORES

(71) Applicant: EcoTensil Inc., San Rafael, CA (US)

(72) Inventor: Peggy V. K. Cross, Larkspur, CA (US)

(73) Assignee: EcoTensil Inc., San Rafael, CA (US)

( * ) Notice: Subject to any disclaimer, the term of this patent is extended or adjusted under 35 U.S.C. 154(b) by 112 days.

(21) Appl. No.: 18/231,085

(22) Filed: Aug. 7, 2023

(65) Prior Publication Data
US 2023/0371725 A1   Nov. 23, 2023

Related U.S. Application Data

(60) Continuation-in-part of application No. 17/714,050, filed on Apr. 5, 2022, which is a division of
(Continued)

(51) Int. Cl.
*A47G 21/04* (2006.01)
*A47G 21/00* (2006.01)
(Continued)

(52) U.S. Cl.
CPC .............. *A47G 21/06* (2013.01); *A47G 21/04* (2013.01); *B65D 77/245* (2013.01); *A47G 2021/002* (2013.01)

(58) Field of Classification Search
CPC ............ A47G 2021/002; A47G 21/001; B65D 77/245
(Continued)

(56) References Cited

U.S. PATENT DOCUMENTS

| 1,128,114 A | 2/1915 | Doellinger |
| 1,521,768 A | 1/1925 | Herrmann |
| (Continued) | | |

FOREIGN PATENT DOCUMENTS

| DE | 1181122 B | 11/1964 |
| DE | 2946075 A1 | 5/1981 |
| (Continued) | | |

OTHER PUBLICATIONS

ECO-Scoop—Light Objects—A Design Competition About Sustainability—printed Sep. 16, 2011—url: http://www.core77.com/lightobjects/brief.asp and http://www.core77.com/lightobjects/img/1344/default.asp referencing an exhibition starting in Oct. 17, 2006.
(Continued)

*Primary Examiner* — Mollie Impink
(74) *Attorney, Agent, or Firm* — Edward J. Radlo; Radlo & Su

(57) ABSTRACT

A planar utensil element fabricated of a foldable material, and having a length greater than a width. The element comprises first and second scores positioned generally symmetrically about a longitudinal midline of the element, and indicative of where the element is to be folded in order to become a usable utensil; and a third score, generally perpendicular to the first and second scores, traversing the width of the element. The first and second scores each comprise a curved section; the two curved sections form a convex shape with respect to the midline. Folding the element about the first and second scores produces a handle and a bowl; and folding the element 180° about the third score temporarily shortens the length of the element for packaging and shipment purposes, prior to its becoming a usable utensil.

13 Claims, 15 Drawing Sheets

Related U.S. Application Data application No. 15/498,473, filed on Apr. 27, 2017, now abandoned, which is a continuation-in-part of application No. 15/092,895, filed on Apr. 7, 2016, now Pat. No. 9,869,575, and a continuation-in-part of application No. 14/852,616, filed on Sep. 13, 2015, now Pat. No. 9,861,219, said application No. 15/092,895 is a continuation of application No. 14/695,039, filed on Apr. 23, 2015, now abandoned, said application No. 15/498,473 is a continuation-in-part of application No. 14/449,151, filed on Aug. 1, 2014, now abandoned, and a continuation-in-part of application No. 14/445,038, filed on Jul. 28, 2014, now abandoned, and a continuation-in-part of application No. 14/271,415, filed on May 6, 2014, now Pat. No. 9,884,707, said application No. 14/695,039 is a continuation-in-part of application No. 14/214,988, filed on Mar. 16, 2014, now abandoned, and a continuation-in-part of application No. 14/214,992, filed on Mar. 16, 2014, now abandoned, and a continuation-in-part of application No. 14/214,993, filed on Mar. 16, 2014, now abandoned, said application No. 15/498,473 is a continuation of application No. 14/214,993, filed on Mar. 16, 2014, now abandoned, said application No. 14/695,039 is a continuation-in-part of application No. 14/032,194, filed on Sep. 19, 2013, now abandoned, said application No. 14/852,616 is a continuation of application No. 13/797,446, filed on Mar. 12, 2013, now Pat. No. 9,131,793, said application No. 14/449,151 is a continuation of application No. 13/357,557, filed on Jan. 24, 2012, now abandoned, said application No. 14/445,038 is a continuation-in-part of application No. 13/357,557, filed on Jan. 24, 2012, now abandoned.

(60) Provisional application No. 61/890,313, filed on Oct. 13, 2013, provisional application No. 61/820,667, filed on May 7, 2013, provisional application No. 61/786,434, filed on Mar. 15, 2013, provisional application No. 61/794,880, filed on Mar. 15, 2013, provisional application No. 61/794,613, filed on Mar. 15, 2013, provisional application No. 61/712,610, filed on Oct. 11, 2012, provisional application No. 61/699,787, filed on Sep. 11, 2012, provisional application No. 61/699,808, filed on Sep. 11, 2012, provisional application No. 61/435,975, filed on Jan. 25, 2011.

(51) Int. Cl.
*A47G 21/06* (2006.01)
*B65D 77/24* (2006.01)

(58) Field of Classification Search
USPC .......................................... 229/401, 125.03
See application file for complete search history.

(56) References Cited

U.S. PATENT DOCUMENTS

| | | | |
|---|---|---|---|
| 1,607,864 A | 11/1926 | Butler | |
| 1,625,335 A | 4/1927 | Schneider | |
| 1,633,605 A | 6/1927 | Prudden | |
| 1,657,325 A | 1/1928 | Suttle | |
| 1,808,949 A | 6/1931 | Flynn | |
| 1,851,942 A | 3/1932 | Christie | |
| 1,907,737 A | 5/1933 | Christie | |
| 2,298,987 A | 10/1942 | Thomsen | |
| 2,375,266 A | 5/1945 | Wilson | |
| 2,433,926 A | 1/1948 | Sayre | |
| 2,453,393 A | 11/1948 | Wilson | |
| 2,584,379 A | 2/1952 | Chmielewski | |
| 2,598,987 A | 6/1952 | Franzen | |
| 2,728,516 A | 12/1955 | Rodman | |
| 2,745,586 A | 5/1956 | Thoma | |
| 2,867,365 A | 1/1959 | La Tourette, Jr. | |
| 3,121,951 A | 2/1964 | Green | |
| 3,122,779 A | 3/1964 | Blechschmidt | |
| 3,197,057 A | 7/1965 | Weitzner | |
| 3,334,778 A | 8/1967 | Saunders | |
| 3,349,987 A | 10/1967 | Weitzner | |
| 3,367,484 A | 2/1968 | Nelson | |
| 3,380,307 A | 4/1968 | De Frank | |
| 3,445,033 A | 5/1969 | Sweet | |
| 3,458,107 A | 7/1969 | Lane et al. | |
| 3,487,974 A | 1/1970 | Schovee | |
| 3,514,029 A | 5/1970 | Powell | |
| 3,526,566 A | 9/1970 | McIlvain, Jr. et al. | |
| 3,623,632 A | 11/1971 | Chang | |
| 3,679,093 A | 7/1972 | Chang | |
| 3,722,779 A | 3/1973 | Chang | |
| 3,780,944 A | 12/1973 | Zubalik | |
| 3,828,999 A | 8/1974 | Humphrey | |
| 3,931,925 A | 1/1976 | Ruff | |
| 3,955,742 A | 5/1976 | Marshall et al. | |
| 3,961,566 A | 6/1976 | Westphal et al. | |
| 4,036,398 A | 7/1977 | Hoogvelt et al. | |
| 4,060,176 A | 11/1977 | Tobiasson | |
| 4,201,795 A | 5/1980 | Yamanaka | |
| 4,218,010 A | 8/1980 | Ruff | |
| D257,406 S * | 10/1980 | Ouellette | 294/1.3 |
| 4,251,097 A | 2/1981 | Whitten, II | |
| 4,324,343 A | 4/1982 | Moller | |
| 4,348,421 A | 9/1982 | Sakaibara et al. | |
| 4,393,988 A | 7/1983 | Burke | |
| D270,887 S | 10/1983 | Allgeyer et al. | |
| 4,413,034 A | 11/1983 | Anderson | |
| 4,635,843 A | 1/1987 | Tomlinson | |
| 4,641,752 A | 2/1987 | Palffy | |
| D295,383 S | 4/1988 | Anderson et al. | |
| 4,830,222 A | 5/1989 | Read | |
| 4,836,593 A | 6/1989 | Cooley | |
| D302,793 S | 8/1989 | Yamaguchi | |
| D309,210 S | 7/1990 | Seyfert | |
| 4,940,189 A | 7/1990 | Cremonese | |
| 4,962,849 A | 10/1990 | Anderson | |
| 5,011,006 A | 4/1991 | Anderson | |
| 5,065,923 A | 11/1991 | Hoefer et al. | |
| 5,251,774 A | 10/1993 | Engle | |
| 5,358,175 A | 10/1994 | Cai | |
| 5,381,905 A | 1/1995 | Mallmamm et al. | |
| 5,419,049 A | 5/1995 | MacArthur-Onslow | |
| 5,491,897 A | 2/1996 | Michelena | |
| 5,618,112 A | 4/1997 | Lovell | |
| 5,695,084 A | 12/1997 | Chmela et al. | |
| 5,705,212 A | 1/1998 | Atkinson | |
| 5,797,636 A | 8/1998 | Hamynen | |
| 5,868,254 A | 2/1999 | Price et al. | |
| 5,878,461 A | 3/1999 | Killian | |
| 5,884,953 A | 3/1999 | Leighton et al. | |
| 5,992,667 A | 11/1999 | Huang | |
| 5,996,887 A | 12/1999 | Cai et al. | |
| 6,003,710 A | 12/1999 | Huang | |
| 6,068,114 A | 5/2000 | Zimmerman et al. | |
| D429,147 S | 8/2000 | Baker et al. | |
| 6,247,735 B1 | 6/2001 | Berkman | |
| D444,672 S | 7/2001 | Miura | |
| 6,308,833 B1 | 10/2001 | Oravez | |
| 6,371,324 B1 | 4/2002 | Torniainen et al. | |
| D456,707 S | 5/2002 | Agarwal | |
| 6,412,653 B1 | 7/2002 | Waterhouse | |
| 6,604,645 B1 | 8/2003 | Vaupotic | |
| 6,604,646 B2 | 8/2003 | Torniainen et al. | |
| 6,708,735 B1 | 3/2004 | Kenihan | |
| 6,751,873 B2 | 6/2004 | Mattson et al. | |
| 6,817,480 B1 | 11/2004 | Baldasio | |
| 6,840,395 B2 | 1/2005 | Agarwal et al. | |

(56) References Cited

U.S. PATENT DOCUMENTS

| | | |
|---|---|---|
| 6,840,397 B1 | 1/2005 | Rosenberg |
| 6,889,866 B2 | 5/2005 | Gilliam et al. |
| D514,884 S | 2/2006 | Smith et al. |
| D528,432 S | 9/2006 | Snedden et al. |
| D530,986 S | 10/2006 | Lago-Arenas |
| 7,275,652 B2 | 10/2007 | Morris et al. |
| D554,951 S | 11/2007 | McGrath |
| D571,162 S | 6/2008 | Fite, IV et al. |
| 7,472,668 B2 * | 1/2009 | Lau ................ E01H 1/1206 294/1.3 |
| 7,597,063 B2 | 10/2009 | Hartzell |
| 7,637,417 B2 | 12/2009 | Fite, IV et al. |
| D612,692 S | 3/2010 | Menceles |
| 7,823,743 B2 | 11/2010 | McKahan et al. |
| 7,971,774 B2 | 7/2011 | Yaloz et al. |
| D646,529 S | 10/2011 | Cross |
| D651,480 S | 1/2012 | Cross |
| 8,201,862 B2 | 6/2012 | Langley |
| 8,210,381 B2 | 7/2012 | Cross |
| 8,313,001 B1 | 11/2012 | Reid et al. |
| D686,045 S | 7/2013 | Stewart et al. |
| 8,484,855 B1 | 7/2013 | King, Sr. |
| 8,695,828 B2 | 4/2014 | Cross |
| 9,131,793 B2 | 9/2015 | Cross |
| 9,265,372 B2 | 2/2016 | Stewart-Stand |
| 9,272,807 B2 | 3/2016 | Stewart-Stand |
| 9,301,631 B2 | 4/2016 | Siren |
| 9,474,399 B2 | 10/2016 | Cross |
| D995,231 S | 8/2023 | Andersen |
| 2002/0060220 A1 | 5/2002 | Torniainen et al. |
| 2002/0100797 A1 | 8/2002 | Hollingsworth et al. |
| 2002/0114870 A1 | 8/2002 | Rebhorn et al. |
| 2003/0029868 A1 | 2/2003 | Davidov et al. |
| 2003/0222465 A1 | 12/2003 | Fonfrias |
| 2005/0115974 A1 | 6/2005 | Micciulla |
| 2005/0209075 A1 | 9/2005 | Kocherga et al. |
| 2005/0258655 A1 | 11/2005 | Matthews et al. |
| 2006/0191983 A1 | 8/2006 | Cargile, Jr. |
| 2006/0248732 A1 | 11/2006 | Straube |
| 2006/0289541 A1 | 12/2006 | Boback et al. |
| 2007/0084064 A1 | 4/2007 | Fite, IV et al. |
| 2007/0227919 A1 | 10/2007 | True |
| 2008/0048463 A1 | 2/2008 | Selenke et al. |
| 2008/0072432 A1 | 3/2008 | Teys et al. |
| 2008/0093366 A1 | 4/2008 | McKahan et al. |
| 2008/0110885 A1 | 5/2008 | Cross |
| 2008/0245682 A1 | 10/2008 | Foulke |
| 2009/0205209 A1 | 8/2009 | Tovar |
| 2009/0294454 A1 | 12/2009 | Harding |
| 2010/0059578 A1 | 3/2010 | Widener |
| 2010/0194128 A1 | 8/2010 | Langley |
| 2010/0218382 A1 | 9/2010 | Scott |
| 2010/0288826 A1 | 11/2010 | Yaloz et al. |
| 2011/0081543 A1 | 4/2011 | Lee et al. |
| 2011/0303678 A1 | 12/2011 | Zomorodi et al. |
| 2012/0052162 A1 | 3/2012 | Goulart |
| 2013/0097877 A1 | 4/2013 | Cross |
| 2014/0069933 A1 | 3/2014 | Cross |
| 2014/0103675 A1 | 4/2014 | Cross |
| 2014/0190022 A1 | 7/2014 | Siren |
| 2014/0238987 A1 | 8/2014 | Brooks |
| 2014/0259697 A1 | 9/2014 | Cross |
| 2014/0261024 A1 | 9/2014 | Cross |
| 2014/0291333 A1 | 10/2014 | Cross |
| 2014/0332539 A1 | 11/2014 | Cross et al. |
| 2015/0257560 A1 | 9/2015 | Boateng, II et al. |
| 2016/0066722 A1 | 3/2016 | Cross |
| 2016/0297604 A1 | 10/2016 | Gabler |

FOREIGN PATENT DOCUMENTS

| | | | |
|---|---|---|---|
| DE | 9312076 U1 | 3/1994 | |
| EP | 1142522 A1 | 10/2001 | |
| EP | 1418134 A1 | 5/2004 | |
| EP | 1640506 A2 | 3/2006 | |
| EP | 2591706 A1 | 5/2013 | |
| EP | 2895033 | 7/2015 | |
| EP | 2994396 | 3/2016 | |
| EP | 2129592 | 10/2019 | |
| EP | 3 750 456 B1 | 3/2021 | |
| EP | 4 082 404 A1 | 11/2022 | |
| FR | 897092 A1 | 3/1945 | |
| FR | 2684072 | 5/1993 | |
| FR | 2806710 A1 | 9/2001 | |
| FR | 2942461 A1 | 8/2010 | |
| GB | 334367 A | 9/1930 | |
| GB | 437392 A | 10/1935 | |
| GB | 2249470 A | 5/1992 | |
| GB | 2379158 A | 3/2003 | |
| GB | 2547098 A | 8/2017 | |
| JP | 52012089 U | 1/1977 | |
| JP | 52155685 U | 11/1977 | |
| JP | 53068780 U | 6/1978 | |
| JP | 53155685 U | 6/1978 | |
| JP | 5345836 | 11/1978 | |
| JP | 10019636 A | 1/1988 | |
| JP | H0226572 U1 * | 2/1990 | ............. A47G 21/04 |
| JP | 3032192 U9 | 10/1996 | |
| JP | 2571122 Y2 * | 5/1998 | |
| JP | H0636464 U * | 5/1998 | ............. A47G 21/04 |
| JP | 10167276 | 6/1998 | |
| JP | 2000162016 A | 6/2000 | |
| JP | 2000166735 A | 6/2000 | |
| JP | 3281262 B2 | 5/2002 | |
| JP | 3374276 B2 | 2/2003 | |
| JP | 3636280 B2 | 4/2005 | |
| KR | 19980043381 U * | 9/1998 | |
| KR | 200184337 Y1 | 6/2000 | |
| KR | 1020020026221 A | 4/2002 | |
| KR | 20040024958 A | 3/2004 | |
| KR | 200382814 Y1 | 4/2005 | |
| KR | 200386861 Y1 | 6/2005 | |
| KR | 20060071655 A * | 6/2006 | |
| KR | 20160047801 A * | 5/2016 | ............. A47G 21/04 |
| NL | 1000122 C2 | 10/1996 | |
| WO | 199611858 | 4/1996 | |
| WO | 2007048055 A1 | 4/2007 | |
| WO | 2008061080 A2 | 5/2008 | |
| WO | 2014042705 A1 | 3/2014 | |
| WO | 2014059369 A1 | 4/2014 | |
| WO | 2014182747 A1 | 11/2014 | |
| WO | 2020/043251 A1 | 3/2020 | |

OTHER PUBLICATIONS

11559518—EcoScoop_Arran Smilh.pdf, "Eco-Scoop Biodegradable Eating Utensil", Arran Smith, Corflot, 2004 Exhibition, pp. 1-5, http://www.coroflot.com/ags/Eco-Scoop/1, Retrieved Dec. 5, 2011.

Extended European search report mailed on Jan. 31, 2017 for European patent EP2994396 granted and published by the EPO on Mar. 16, 2016 (with an international filing date of May 6, 2014), 7 pages.

International Search Report (ISA/KR) mailed May 30, 2011 for International Patent Application PCT/US2007/084499 filed Nov. 13, 2007.

Written Opinion of the International Searching Authority (ISA/KR) mailed May 30, 2011 for International Patent Application PCT/US2007/084499 filed Nov. 13, 2007.

International Search Report (ISA/KR) mailed Sep. 25, 2013 for International Patent Application PCT/US20013/038598 filed Apr. 29, 2013.

Written Opinion of the International Searching Authority (ISA/KR) mailed Sep. 25, 2013 for International Patent Application PCT/US20013/038598 filed Apr. 29, 2013.

International Search Report and Written Opinion (ISA/KR) mailed Jan. 16, 2014 for International Patent Application PCT/US2013/064689 filed Oct. 11, 2013.

International Search Authority's Written Opinion (ISA/KR) mailed Oct. 27, 2014 for International Patent Application PCT/US2014/037037 filed May 6, 2014.

(56) References Cited

OTHER PUBLICATIONS

International Search Report (ISA/KR) mailed Oct. 27, 2014 for International Patent Application PCT/US2014/037037 filed May 6, 2014.
European search report mailed on Jun. 7, 2011 for European patent EP 2129592 granted and published by the EPO on Oct. 16, 2019 (with an international filing date of Nov. 13, 2007).
Supplementary European search report and Examination mailed on Nov. 16, 2012 for European patent EP 2129592 granted and published by the EPO on Oct. 16, 2019 (with an international filing date of Nov. 13, 2007).
Supplementary European search report mailed on Apr. 20, 2016 for European patent EP 2895033 granted and published by the EPO on Jul. 22, 2015 (with an international filing date of Apr. 29, 2013).

* cited by examiner

ECOTASTER with BACKSTOP

Additional fold to prevent liquids from spilling out the back of the spoon

ECOSPOON with perp.fold

SPOONLIDZ

Spoon as it appears undeformed.
Outer perimeter can be other shapes besides circular.

Spoon after being folded along first score

Spoon after being folded along second set of scores

UTENSILS HAVING INWARDLY CURVING AND PERPENDICULAR SCORES

RELATED PATENT APPLICATIONS

The present patent application claims priority to 25 commonly-owned patent applications, as listed on the accompanying Application Data Sheet (ADS). All 25 of the priority patent applications listed on said ADS are hereby incorporated by reference in their entireties into the present patent application.

FIELD OF THE INVENTION

The present invention relates generally to foldable utensils, and more specifically to foldable utensils each comprising a planar element that is scored across its width in order to enable the temporary shortening of the length of the element to facilitate its packaging and shipment to the end user.

BACKGROUND OF THE INVENTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

As market acceptance for constructible utensils increases, alternative designs and implementations offer retailers and consumers more choices to further increase market acceptance (including functions, cost, and ease of use).

Sustainability, recyclability, and compostability are becoming increasingly important to retailers and consumers. However, not everyone uses the terms correctly—marketers sometimes use these terms indiscriminately and vaguely, often to the frustration of environmentally and socially conscious manufacturers, retailers, and users who desire more accuracy. Increasingly, standards for sustainability are being developed and used to help retailers and consumers avoid "green washing" for the products that they buy and use.

For true ecological friendliness, materials and products must meet specific, ever-evolving standards and requirements. The "green" world employs a special lexicon, particularly for words such as degradable, biodegradable, recyclable, sustainable, and compostable.

Degradable plastics are oil based, and break down through chemical reactions rather than the activity of microorganisms, so they can degrade in an anaerobic environment into water, $CO_2$, biomass, and trace elements. For example, the term "biodegradable" by itself does not mean much when biodegradable plastics and some types of biodegradable spoons include products that may take 100's to 1,000's of years to degrade. Since "biodegradable" specifies NO time limits, for the purposes of composting and sustainability, "biodegradable" is a meaningless term.

To be considered compostable, plastic material must break down within 180 days in a commercial compost facility. Biodegradable plastic has no time limit. According to the American Society for Testing & Materials (e.g., ASTM 06400-2004 "Standard Specification for Compostable Plastics," ASTM International, West Conshohocken, PA, 2003, DOI: 10.1520/06400-04, hereby expressly incorporated by reference into the present patent application in its entirety for all purposes), for plastic to be considered as compostable, it must be able to break down into carbon dioxide, water, and biomass at the same rate as paper. It also needs to look like compost, should not produce any toxic material, and should be able to support plant life. Compostable items are made from plant materials such as corn, potato, cellulose, soy, sugar, and the like.

Another important ASTM standard is ASTM 06868-2011 "Standard Specification for Labeling of End Items that Incorporate Plastics and Polymers as Coatings or Additives with Paper and Other Substrates Designed to be Aerobically Composted in Municipal or Industrial Facilities," ASTM International, West Conshohocken, PA, 2003, DOI: 10.1520/D6868-11, also hereby expressly incorporated by reference into the present application in its entirety for all purposes. This specification establishes the requirements for labeling of materials and products (including packaging), wherein a biodegradable plastic film or coating is attached (either through lamination or extrusion directly onto the paper) to compostable substrates, and the entire product or package is designed to be composted in municipal and industrial aerobic composting facilities within 180 days.

The term "compostable" until recently was subject to some ambiguity. Certifications and representations of compostability most often reference commercial/municipal composting facilities that precisely control the environment (e.g., temperature) and microbes (e.g., periodic infusion of appropriate quantities of the appropriate microbes). Few bio-based utensils are certified compostable; and most include varying amounts of plant based starch and petroleum, and take over the required 180 days or more to compost under the best of conditions. Home composting is rarely an option for these materials. Some "biodegradable" products like Taterware may take years to degrade—compost facilities either disallow all bioplastic utensils or pick them out of the compost at the end of the composting process.

Consumers have become increasingly skeptical of certain claims as to the various "green" attributes of various manufacturers and products since the introduction of "biodegradable plastics" in the late 1980s. Although touted as "environmentally friendly," many so-called biodegradable plastic products did not compost as implied. And yet manufacturers of these products were able to make claims of "biodegradable" because no scientifically based definitions, test methods, and standards existed. Promulgation, adoption, and use of the ASTM specifications, definitions, and tests mentioned above provide a standard by which products and materials may be evaluated. To this end, there are organizations that provide certification of conformance to one or more of these standards as appropriate. For example, the Biodegradable Products Institute, 331 West 57th Street, Suite 415, New York, NY 10019 has created a "compostable logo" which is designed to help remove some of the confusion for consumers. The compostable logo builds credibility and recognition for products that meet the ASTM 06400 and/or 06868 standards so consumers, composters, regulators, and others can be assured that the product will compost as expected.

As consumers, composters, waste scavengers, regulators, and others continue to develop the technologies and processes for efficiently handling and sorting consumer waste, consumers and businesses (collectively purchasers) are on the front line and make important decisions. The decisions include selection, use, and disposal of products. Selection is important, based upon a purchaser's understanding the degradability of the product and, as noted above, can be improved by certifications informing a purchaser of the attributes of a product. Additionally, based upon experience and history that the purchaser has with particular products, the purchaser may be influenced towards selection or use. This is important with utensils designed for foodstuffs—how the utensil feels in the mouth of the user is important. Coatings, sharp edges, dimensions, sturdiness, and the like all play a part in selection and use.

After selection and use, the user decides on, or initiates/ influences, post-use handling. It is not always clear to the user whether a product is recyclable, compostable, or should be included as trash. Users are often confronted with a multitude of bins with disposal options. For some products, it is problematic to select the wrong receptacle. And the propriety is not just a simple matter of knowing the characteristics of the product—one sometimes needs to know the specifics of the processing used by the disposal/recycling/ scavenging entity to match a product to the right process capabilities of recycler/scavenger. This can be overwhelming to a user, and can produce undesirable outcomes for the intended "green" behavior. For example, many petroleum-based utensils are recyclable, and most bio-based plastics are NOT recyclable. Most users cannot readily distinguish one composition from another to allow them to properly manage the product, even if they were current as to the recycling capabilities of the local processor.

As varying compositions of consumer-products are introduced, the user becomes increasingly confused as to which product that they want to process is recyclable, and how to quickly and error-free sort the various products. Some "green" conferences have recycling advisors stationed at waste collecting areas to help educate users.

There are many instances where single-use products are currently used for tasting and consuming foodstuffs. Mostly these products are made from a plastic or a bio-material that is not, or is insufficiently, compostable and easily biodegradable. These products typically come preformed into the recommended configuration for use by the user.

To compound the problem, there are many venues in which utensils are single-use (e.g., foodstuff tasting/dispensing utensils or single-serving disposable utensils). Not only is the sorting/processing problem multiplied by the sheer volume of these products used world-wide, they also use up too many resources. This is because these products also have the further undesirable characteristic of attempting to emulate conventional multi-use utensils in their construction and arrangement, which results in poor packing density. Manufacturers, distributors, and retailers are increasingly concerned about cube utilization (amount of product that can be shipped/stored in a specific cubic volume). The less efficient the cube utilization, particularly as compared to alternative products, the more costly it becomes to ship and warehouse.

It is not always the case that a utensil design scales well, as seen in many "mini" tasting spoons that yield a bowl that is often too small and shallow for properly supporting, dispensing, and consuming adequate serving sizes of a range of foodstuff. Both the retailer and the end-user can become frustrated by this. Sometimes the design is further altered after scaling, which results in more material and often worse cube utilization. Not only can these products be inefficient, such products often take up an unnecessarily large amount of space in the preformed configurations, while being inefficient and costing more. It is understandable as preformed configurations in consumer-familiar designs is believed to maximize strength while minimizing user complexities.

Compounding the problem further, bioplastics use more material in their construction because they do not have the same material properties (e.g., tensile strength of bio-material versus stainless steel versus conventional petroleum-based plastic). There are many disadvantages to conventional tasting/single-use utensils, particularly to those attempting to be truly environmentally friendly.

Currently, there are several "green" factors that can be independently evaluated, which include: recyclable, renewable, compostable, and sustainable, and usage of material efficiency and cube utilization efficiency for volume and weight. Products and processes that measure favorably against these factors while being friendly, convenient, effective, and efficient for the retailer, consumer, and waste processor are preferred.

What is needed are systems and methods for meeting market demand for better constructible utensils.

SUMMARY OF THE INVENTION

The present invention pertains to superior constructible utensils, and methods for manufacturing the utensils. The following summary of the invention is provided to facilitate an understanding of some of technical features related to constructible utensils, particularly to those used as a spoon-lid or single-use tasters, and is not intended to be a full description of the present invention. A full appreciation of the various aspects of the invention can be gained by taking the entire specification, claims, drawings, and abstract as a whole. The present invention is applicable to other constructible utensils as well as constructible paperboard structures other than utensils.

A deformable sheet defines a handle and an operational element in which one or more scores, both straight and curved, are cooperatively provided on the sheet. The one or more scores enable deformation of the handle and/or operational element(s) to convert the structure into a strong, sturdy, and functional implement sufficient to meet the required application. In the preferred embodiment, the unconstructed utensil is provided on a planar sheet made of the requisite material (i.e., an appropriately green/sustainable material) that may be processed to enhance function (e.g., coated with environmentally appropriate material) to resist premature degradation during use (e.g., a moisture-barrier), or it may be manufactured of a moisture-barrier material (e.g., calcium carbonate), collectively a coating, whose inherent characteristic or other moisture protection system is referred to as moisture-barrier property. Thus, quantities of the unconstructed material achieve a far greater packing density as compared to pre-constructed utensils, which saves money on shipping and storage because of the smaller cube size. For many applications, the handle and operational elements are minimalist in material cost while maximizing structural strength and user-experience consistent with the intended use, all the while having a smaller carbon footprint.

The handle, typically with a curved score that defines a folding axis, is operated by bringing portions closer together out of the plane (e.g., folding or otherwise deforming) the handle along the one or more handle scores. This folding induces a responsive distortion/deformation of the operational element to create the desired functional element. The curved score(s), in cooperation with the structural organization and composition, produce a constructed utensil that meets or exceeds performance of conventional preformed disposable/single-use utensils. This provides a superior option over conventional constructed utensils, because the user gains the advantage of an improved single-use application while the utensil is eco-friendly, as it has a minimalist design that is effective and capable of being made compostable and/or recyclable with recyclable, sustainable, renewable resources. These constructible utensils may be particularly configured for specific applications, including tasting, stirring, spreading, consuming harder/firmer foodstuffs, "fork-like" utensil, and the like.

Manufacturers have an option of configuring the base material, the periphery boundary, the placement and orientation of scores, and any coating to customize the final design in a wide variety of ways. As further explained herein, the user-constructible utensils include tasters; spreaders, stirrers that can have appropriately shaped handles and operational elements (e.g., bowls for a tasting spoon) that have the desired capacity, shape, and mouth-feel. Some bowls may have a deep configuration for more capacity while others may be shallower and sturdier to serve dense/hard foodstuff (e.g., ice cream). The fundamental teachings herein are adaptable to a wide-variety of user-constructible utensils for a wide variety of tasks. In some cases, the utensil doubles as a dispensing mechanism, in lieu of a cup, which is particularly important for applications that use a utensil along with a cup and/or plate/napkin, cracker, or the like, providing valuable cost savings.

In some embodiments, such as a dispensing and tasting implement at a food show or the like, the base material and scores are arranged and configured so that a deformed handle (e.g., folded) maintains a sufficiently useful fold after being released from the folder to retain the desired configuration of the operational end. For example for a tasting spoon, several utensils may be configured including folding the handle to produce the bowl. The folded utensils are set on a work surface and a product is placed into each of the bowls, Consumers may simply pick up a utensil and sample the product without any other apparatus. This allows for one-handed sampling, as opposed to cup and spoon, which is ideal for consumers having their hands full with products, information, containers, children, and the like. In many of the preferred embodiments, lateral edges of the planar apparatus are folded up to produce a handle and bowl, often leaving a planar medial portion of the handle and bowl that provide a stable platform for adding, dispensing, and presenting the product to the prospective consumers. Most tasting spoons could not be arrayed and used in this fashion, as they are not large enough or stable enough and do not have the upward-extending handle portions to allow them to be easily grasped. In this way, packing density for dispensing and presenting is improved, and retailers/users may select from a middle of the array with greatly reduced risk of touching or otherwise contaminating foodstuff in other utensils.

Particularly for those applications that include a disposable plate, cup, napkin for dispensing and a utensil to consume, the versatility of the implementations of the present invention in combining these functions further saves costs and reduces environmental impact in the pre-consumer and post-consumer costs of such scenarios.

As noted above, many existing single use solutions attempt to emulate conventional utensils. While this is desirable to simplify training and use of the utensils, the products are often wasteful of material (and in some cases extra unneeded material results in the material/product taking up excessive space, which further adds to costs in transportation and storage and is "anti-green"), particularly for applications where the utensil may be used for a few seconds. Considering that some current utensils are used for just a few seconds and may exist in landfills for centuries points out one of the many problems addressed and mitigated by embodiments of the present invention.

The preferred implementations of the present invention provide a greatly reduced carbon footprint due to several factors, including use of a new minimalist design (rather than scaling of previous utensils) that both uses less material and reduces unnecessary material and uses environmentally friendly materials. This is true even in cases where the material is misprocessed by the consumer after use. For example, if a compostable EcoTensil® brand utensil ends up in a landfill, it will have an increased chance to be partially-to-substantially degraded by the time it gets to a landfill, where under normal conditions it would not degrade. (Modern landfill designs attempt to minimize any degradation of all materials by removing oxygen and other requirements for biodegradation/composting). Because the product has minimal material use and quickly degrades, the product lends itself to interstitial location among the nooks and crannies of other more rigid elements of the landfill, which effectively removes its contribution to the landfill volume.

Reduction in material used in the designs helps to maximize an amount of pre-disposal degradation that occurs, which is advantageous no matter whether the consumer selected the correct disposal option. The advantages of minimal construction are magnified when also considering the production, shipment, storage, use, and disposal volumes. The reduced eco-footprint appears all along the lifespan of the product, and savings and advantages are compounded when considering the entire lifecycle.

A constructible utensil, such as for a taster for example, includes a deformable generally planar rigid paperboard sheet defining a body, the body including a handle element having a fold axis and a bowl element coupled to the handle element, wherein the handle element is generally elongate and rectilinear and includes a length generally parallel to the fold axis that is at least two times greater than a width generally perpendicular to the fold axis; a first curved score disposed on the body and extending from a first point on the bowl element proximate a first edge of the bowl element to a second point on the handle element proximate the fold axis; and a second curved score disposed on the body and extending from a third point on the bowl element proximate a second edge of the bowl element towards the second point; wherein the scores are generally concave with respect to the fold axis; and wherein the body is configured with an arrangement of the scores such that a folding of the body about the fold axis introduces a bowl in the bowl element by distortion of the bowl element along the curved scores.

A constructible utensil, such as for a stirrer for example, includes a deformable generally planar rigid sheet material defining a body, the body including a handle element having a fold axis and a bowl element coupled to the handle element at a transition area, wherein the handle element is generally elongate and includes a length generally parallel to the fold axis that is at least ten times greater than a first width generally perpendicular to the fold axis; a first score disposed on the body and extending from a first point on the bowl element to a second point on the handle element proximate the fold axis and crossing the transition area; and a second score disposed on the body and extending from a third point towards the second point, wherein the third point is disposed on the bowl element; wherein the scores are curved and generally concave with respect to the fold axis and generally symmetrical about the fold axis; wherein the body is configured with arrangement of the scores such that a folding of the body about the fold axis introduces a bowl in the bowl element.

A constructible utensil, such as for a spreader for example, includes a deformable generally planar rigid paperboard sheet defining a body, the body including a handle element having a fold path and a spreader element coupled to the handle element wherein the spreader element is generally asymmetrically elongate and includes a first lateral edge generally straight and parallel to the fold path and a second lateral edge generally convexly curved with respect to the fold path and converging to the first lateral edge; a first score disposed on the body and extending from a first point on the spreader element to a second point on the handle element proximate the fold path; and a second score disposed on the body and extending from a third point towards the second point; wherein the body is configured with arrangement of the scores such that a folding of the body about the fold path introduces a bowl in the spreader element.

A constructible utensil includes a deformable generally planar rigid paperboard sheet defining a generally elongate and rectilinear body having a long axis extending from a proximal end to a distal end and a short axis generally perpendicular to the long axis with the body including a fold axis extending along the long axis and the body including a length generally parallel to the fold axis that is at least two times greater than a width generally parallel to the short axis; a first curved score disposed on the body and convex with respect to the fold axis, the first curved score extending from a first point on the body near a first lateral edge of the body at the distal end of the body to a second point on the body proximate the fold axis, wherein the first point is greater than 75% of the length from the proximal end and wherein the second point within 33% of the length from the proximal end; and a second curved score, symmetric about the fold axis to the first curved score and disposed on the body, the second curved score extending from a third point on the body near a second lateral edge of the body at the distal end to the second point; wherein the body is configured with arrangement of the scores such that a folding of the body about the fold axis introduces a bowl in the body at the distal end by distortion in the body along the scores.

A method of manufacturing a constructible utensil includes a) forming a generally elongate and rectilinear body from a deformable generally planar rigid paperboard sheet, the body having a long axis extending from a proximal end to a distal end and a short axis generally perpendicular to the long axis with the body including a fold axis extending along the long axis and the body including a length generally parallel to the fold axis that is at least two times greater than a width generally parallel to the short axis; b) disposing a first curved score on the body, the first curved score convex with respect to the fold axis, the first curved score extending from a first point on the body near a first lateral edge of the body at the distal end of the body to a second point on the body proximate the fold axis, wherein the first point is greater than 75% of the length from the proximal end and wherein the second point within 33% of the length from the proximal end; and c) disposing a second curved score; symmetric about the fold axis to the first curved score, on the body, the second curved score extending from a third point on the body near a second lateral edge of the body at the distal end to the second point; wherein the body is configured with arrangement of the scores such that a folding of the body about the fold axis introduces a bowl in the body at the distal end by distortion in the body along the scores.

A method of constructing a utensil includes a) folding a generally elongate and rectilinear body about a fold axis, the body constructed from a deformable generally planar rigid paperboard sheet; the body having a long axis extending from a proximal end to a distal end and a short axis generally perpendicular to the long axis with the body including the fold axis extending along the long axis and the body including a length generally parallel to the fold axis that is at least two times greater than a width generally parallel to the short axis and the body including a pair of curved scores symmetrically disposed on the body, the pair of curved scores convex with respect to the fold axis, the curved scores extending from a pair of points on the body near opposing lateral edges of the body at the distal end of the body and each converging to a convergence point on the body proximate the fold axis, wherein the pair of points are greater than 75% of the length from the proximal end and wherein the convergence point is within 33% of the length from the proximal end; and b) inducing a bowl in the distal end responsive to the folding step a) by distorting the body along the pair of scores as the body is folded.

A system for serving a foodstuff includes a worksurface; and a plurality of user-constructible utensils constructed into a plurality of shape-retaining utensils with each the shape-retaining utensil including a bowl element supporting a portion of the foodstuff and having a pair of lateral edges folded upwards and retained folded without adhesive due to a configuration of construction materials used in a manufacture of the plurality of user-constructible utensils and wherein the plurality of constructed utensils are arrayed on the worksurface with the upward pair of lateral edges useable as a handle to remove a corresponding utensil and foodstuff from the work surface.

Any of the embodiments described herein may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

Other features, benefits, and advantages of the present invention will be apparent upon a review of the present disclosure, including the specification, drawings, and claims.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION OF PREFERRED EMBODIMENTS

Figure 1:
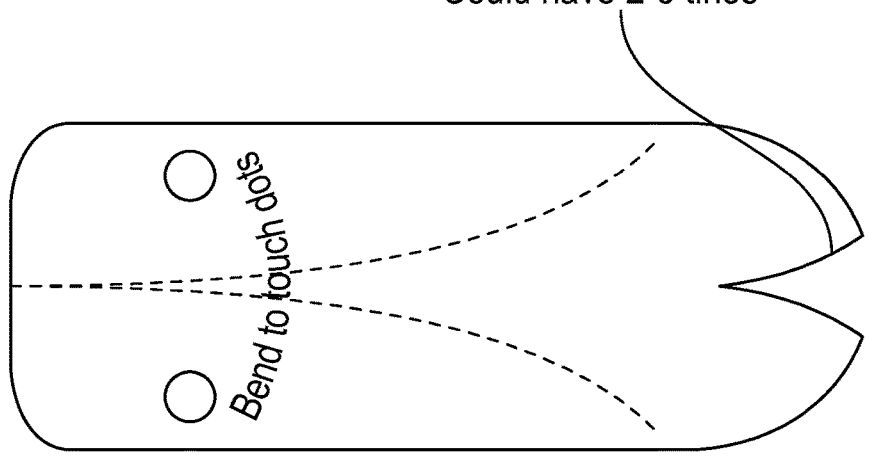
FIG. 1 illustrates a constructible utensil including an exterior perimeter and a score pattern configured to produce a constructible spark.

Embodiments of the present invention provide a system and method for meeting market demand for better constructible utensils. The following description is presented to enable one of ordinary skill in the art to make and use the invention and is provided in the context of a patent application and its requirements.

Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

It should be noted that the Figures include specific shapes, paths, and arrangements of scores used to facilitate formation of three dimensional bowls as a part of a body is folded. The scores have been illustrated to accurately present representative suitable score paths for the particular utensil type and application, particularly with respect to location, arrangement, and placement.

The constructible utensils disclosed herein are generally representative of a wide range of constructible utensils, some of which have been illustrated and described in related patents and patent applications. These related patents and patent applications, all of which have the same inventor, include, but are not limited to, U.S. Pat. No. 8,210,381 issued Jul. 3, 2012, U.S. Pat. No. 9,131,793 issued Sep. 15, 2015, U.S. Pat. No. D646,529 issued Oct. 11, 2011, and U.S. Pat. No. D651,480 issued Jan. 2, 2012; and U.S. patent application Ser. No. 13/357,557 filed Jan. 24, 2012, 61/699,808 filed Sep. 11, 2012, 61/699,787 filed Sep. 11, 2012, 61/712,610 filed Oct. 11, 2012, 61/794,613 filed Mar. 15, 2013, and 61/794,880 filed Mar. 15, 2013, all of which patents and patent applications are hereby expressly incorporated by reference in their entireties into the present patent application.

In some cases, a preferred embodiment includes environmentally friendly materials, which often include paper and paper-like substances. For a utensil, it is the case that the foodstuff may have a significant moisture content. To enhance longevity in terms of preserving structural integrity and strength over the serving/portion size, moisture resistance is important in some implementations. Such utensils may be processed to enhance function (e.g., coated with environmentally appropriate material) to resist premature degradation during use (e.g., a moisture-barrier), or may be manufactured of a moisture-barrier material (e.g., calcium carbonate or the like), collectively a coating, whose inherent characteristic or other moisture protection system is referred to as moisture-barrier property.

Some preferred embodiments include a paperboard sheet material. In some of the descriptions, there are certain score lines that are specifically set forth to be dose to, but spaced away from, an edge of a body or body element of a constructible utensil. For some materials, these scores break down fiber used in the body and could increase moisture absorption. Spacing a terminating end of these score lines away from the physical edge improves moisture absorption resistance.

The preferred embodiments use sustainable tree-based wood fibers due to improved material properties. In some applications, and as additional materials are developed, other materials (such as shorter fibers from other plants or mineral-based substrates) may be used in lieu of tree-based wood fibers. Additionally, the preferred embodiments describe implementations that include multiple curved scores, including multiple curved scores that "bend" inwardly towards each other. Some implementations may include other configurations, including a single curved implementation that produces a bowl when folded along this score.

Some of the disclosed embodiments include configuration changes to a basic constructible single-use taster.

The constructible taster includes a generally "bullet" shaped perimeter having a longitudinal axis about which the constructible taster is generally symmetric. The perimeter is about 1.25 inches wide and about 3.125 inches long (the "bullet" shaped perimeter including a generally rectangular body that is about 1.25 inches×about 2.5625 inches and a semi-disk at one end of the rectangle having a radius of about 0.5625 inches). A handle portion is joined to a functional end with handle portion including a short handle score extending along the longitudinal axis and joining a pair of curved scores extending from lateral edges of the functional end located at a distal end (e.g., opposite of the handle portion at a proximal end). In some implementations the handle score may be omitted, its function provided by an extension of one or more of the curved scores extending towards the proximal end from the distal end. Folding/deforming the proximal end along the handle score (or handle score substitute) induces the deformation of the functional end about the one or more curved scores to create a three-dimensional structure (generally described as arched or bowl-shaped), which adds strength/rigidity and function, such as retaining low-viscosity foodstuff.

The tasters are generally small, and the constructible taster is particularly configured to reduce material use while providing efficient operation. A size and shape of a bowl formed in the constructible taster at the distal end is determined, again, by the arrangement of the scores with respect to the body and its structures. For example, in a preferred embodiment, the scores are close to lateral edges of the body near the distal end (without reaching the edge to improve mouth feel by reducing sharp edges), and converge to a central fold axis near the proximal end and produce the desired bowl shape. The scores are gentle and convex with respect to the fold axis and curve over almost the entire length of the rectilinear body and do not meet until very close to the edge. For purposes of this application in the context of a taster, the scores converge within 33% of the length of the body element from the handle end and most preferably within 10% of the length from the handle end. At the other end, the scores reach near the lateral edges at points greater than 50% of the length and most preferably at points greater than 75%.

Included with the constructible taster are informational indicia (e.g., specifically positioned dots) that identify a preferred location for squeezing/deforming the handle portion. (E.g., bend-to-touch dots, which recreate the desired deformation in the handle to help optimize formation of the functional element.) Preferably, these indicia are placed near where the scores converge, in this case, towards the proximal end of the body, so that the body gradually distorts along scores generally over the entire length.

Figure 15A:
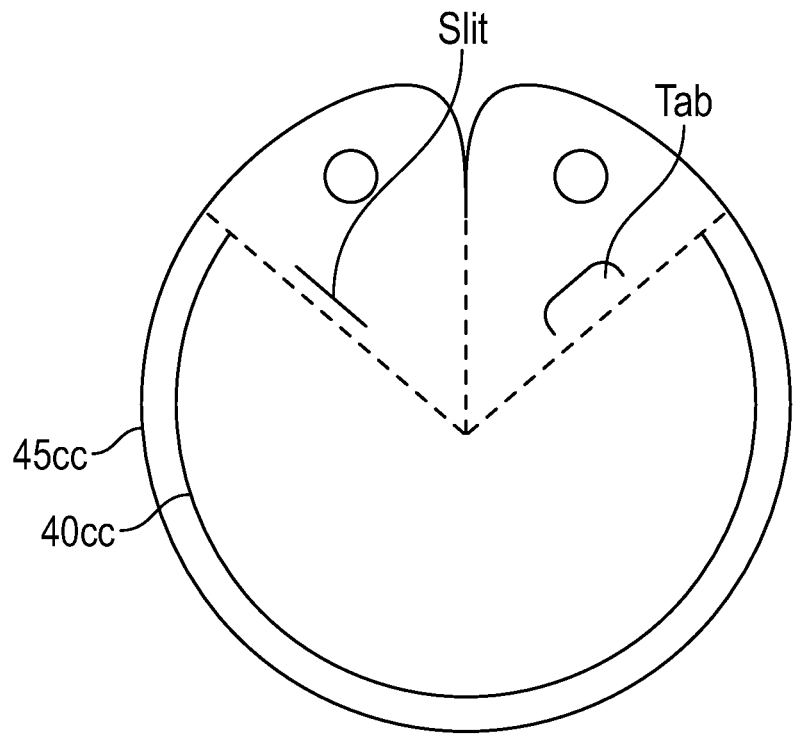
FIG. 15A illustrates a first embodiment of the interconnecting elements, with the invention in a pre-folded form.

In some embodiments, it will be desirable to provide some type of mechanism to maintain the lateral edges of the body (e.g., near the indicia) in a generally folded arrangement to preserve a desired minimum capacity/shape to the formed bowl (and to maintain those lateral edges extending upwards to be easily grasped to permit the constructible taster to be picked up from a work surface, especially with the bowl shape retained). The material selection of the body and the depth and nature of the formation of the scores are one way to provide for a retaining force resisting unfolding when a folding force is removed. In other embodiments, some type of tacky adhesive or interconnecting tabs may be used to hold the lateral edges together and the body in the folded mode. FIG. 15A illustrates a first embodiment of these interconnecting tabs (consisting of a slit formed in a big tab, plus a little tab), with the invention in a pre-folded form.

Figure 15B:
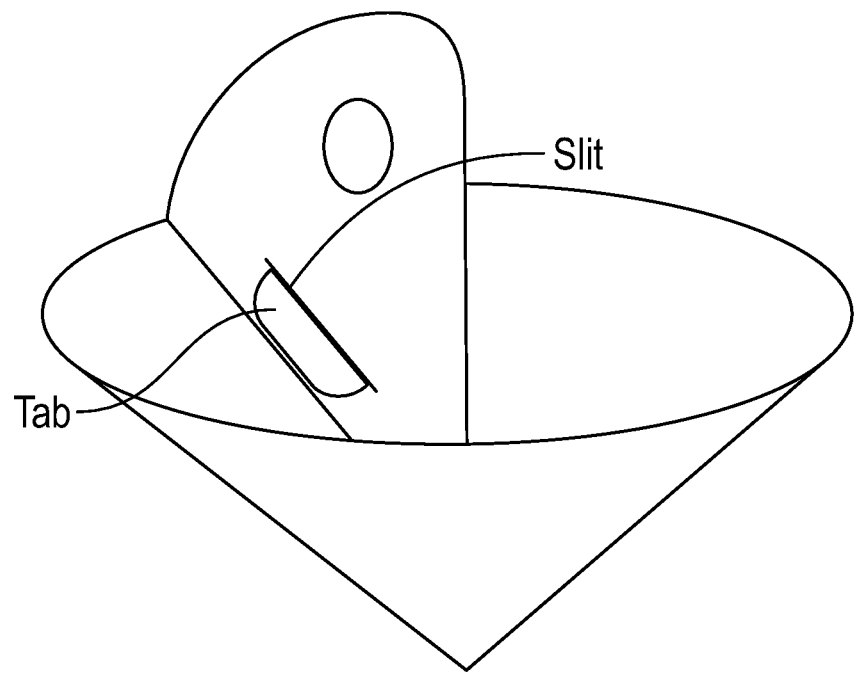
FIG. 15B illustrates the embodiment of FIG. 15A, with the invention in a folded and locked form.
Figure 16A:
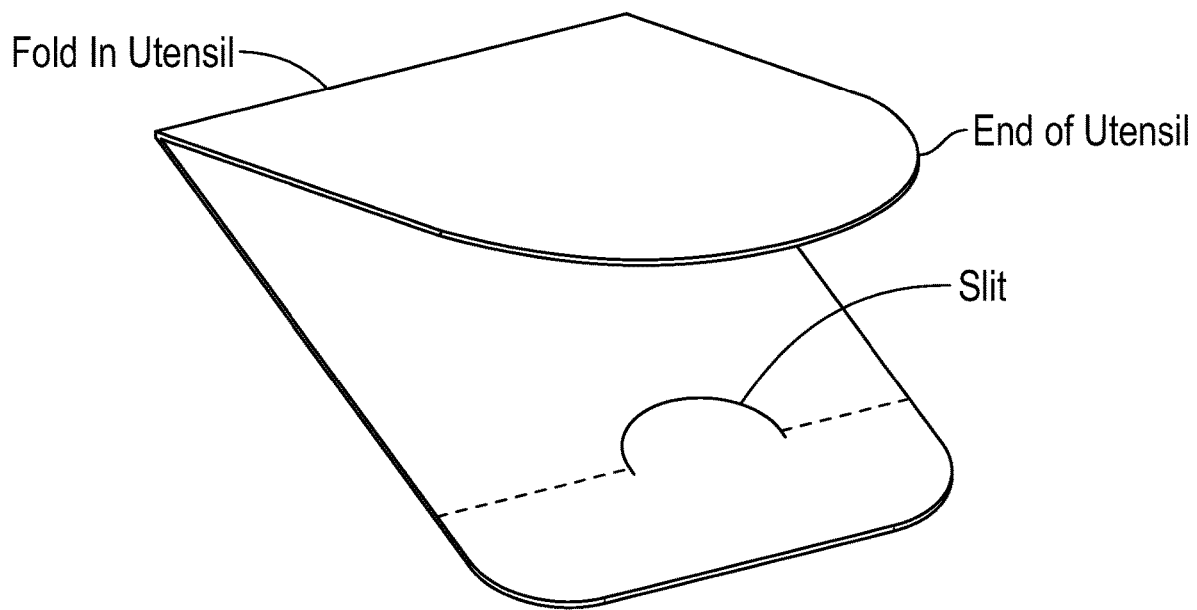
FIG. 16A illustrates a second embodiment of the interconnecting tabs, with the invention in a partially folded and pre-locked form.
Figure 16B:
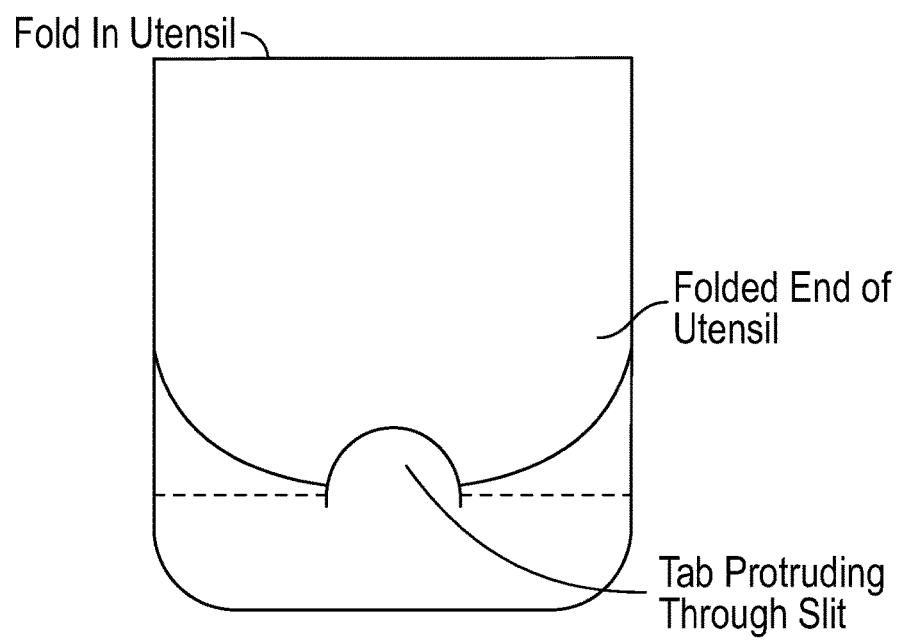
FIG. 16B illustrates the embodiment of FIG. 16A, with the invention in a locked form.

FIG. 15B illustrates the embodiment of FIG. 15A, with the invention in a folded and locked form. FIG. 16A illustrates a second embodiment of these interconnecting tabs (a first tab formed by a rounded slit in one end of the utensil, plus a second tab consisting of the other end of the utensil), with the invention in a partially folded and pre-locked form. FIG. 16B illustrates the embodiment of FIG. 16A, with the utensil in a completely folded and locked form.

The incorporated patents and patent applications describe alternate score patterns and perimeter shapes for the constructible taster and other constructible utensils described herein. Those alternates may be combined with the basic taster and further modified as described herein in keeping with the present invention.

Figure 2:
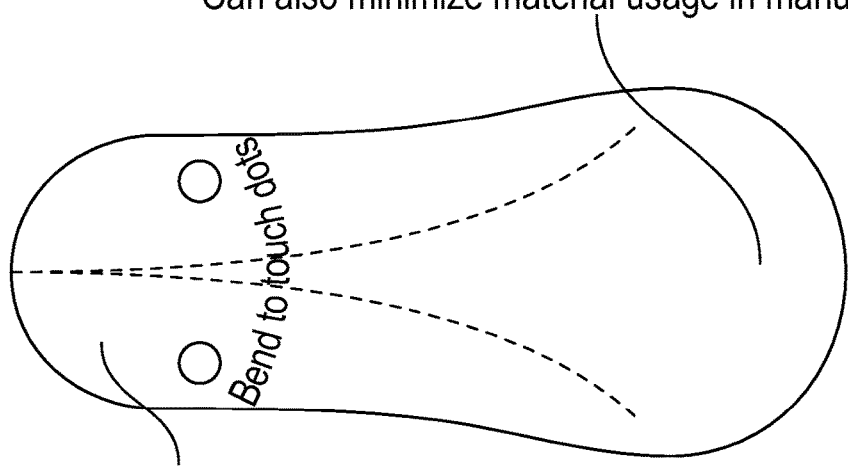
FIG. 2 illustrates a constructible taster utensil including an exterior perimeter and a score pattern configured to produce a constructible taster having a widened operative element.

FIG. 1 illustrates a constructible utensil including an exterior perimeter and a score pattern configured to produce a constructible spark. The constructible spark of FIG. 1 is a modification of the constructible taster, and includes a bowl-producing score pattern, with the forward free curvilinear edge including 2 tines, with 2-5 tines possible with different perimeter notching. The tines of the constructible spork help to spear and catch noodles, salads, fruit salads, and the like, FIG. 2 illustrates a constructible taster utensil including an exterior perimeter and a score pattern configured to produce a constructible taster having a widened operative element. The constructible taster utensil of FIG. 2 is a modification of the constructible taster, and includes a widened spoon end (i.e., the functional end). The constructible taster utensil of FIG. 2 aids the consumer, and can help to reduce material usage during manufacturing.

Figure 3:
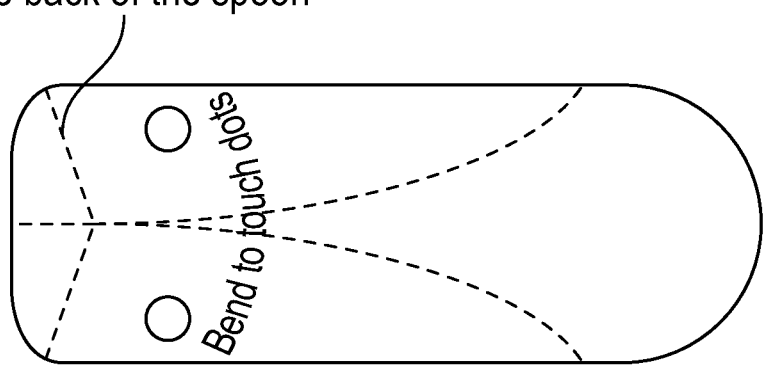
FIG. 3 illustrates both an unconstructed and constructed constructible utensil including an exterior perimeter and a score pattern configured to produce a constructible utensil having a backstop.
Figure 3:
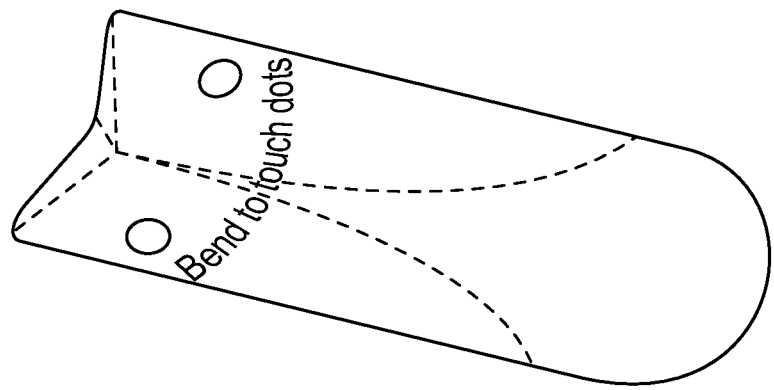

FIG. 3 illustrates both an unconstructed and constructed constructible utensil including an exterior perimeter and a score pattern configured to produce a constructible utensil having a backstop. The constructible taster utensil of FIG. 3 is a modification of the constructible taster, and includes a score pattern having backstop scores at the end of the handle portion. When needed or desired, a consumer is able to fold up the backstop along the backstop scores to create a dam that prevents contents (e.g., liquids) from spilling off the back end of the handle. The backstop scores include a pair of linear scores extending from a common point on the longitudinal axis back towards rear corners of the handle portion. Those scores, combined with a longitudinal score extending from an edge of the handle towards the functional end (which is sometimes present in certain implementation of the constructible taster), cooperate with the pair of linear scores to selectively produce the independently operable backstop. The backstop is independent from the bowl-producing scoring pattern, as the user may or may not use the backstop with a folded and constructed utensil.

Figure 4:
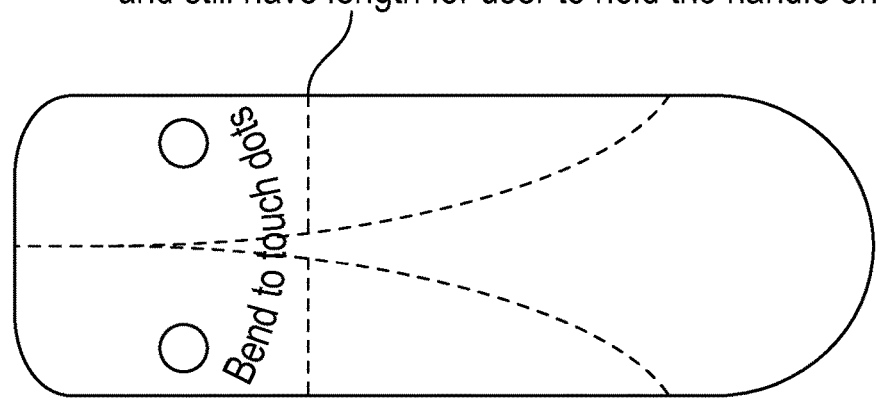
FIG. 4 illustrates a constructible taster utensil including a perpendicular score for length-shortening folding.

FIG. 4 illustrates a constructible taster utensil including a perpendicular score for length-shortening folding. The constructible taster utensil of FIG. 4 is a modification of the constructible taster, and includes a perpendicular (e.g., to the longitudinal axis and/or the fold axis) fold to allow the constructible taster utensil to be length collapsible to fit on small packages. Even though the constructible taster is typically configured to be very short, there are applications in which it is desired to have a shortened constructible taster, such as inclusion in certain small footprint foodstuff containers (e.g., food samples and the like). Also, the constructible taster utensil frequently needs to be longer than the side or top of a container so it can reach into the container and still have length for the consumer to hold the handle end.

The perpendicular fold enables a pre-constructed length of constructible taster utensil shortened for packaging.

Depending upon a location, the folded length may be shortened anywhere from 50% to 75% of the unfolded length.

Figure 5:
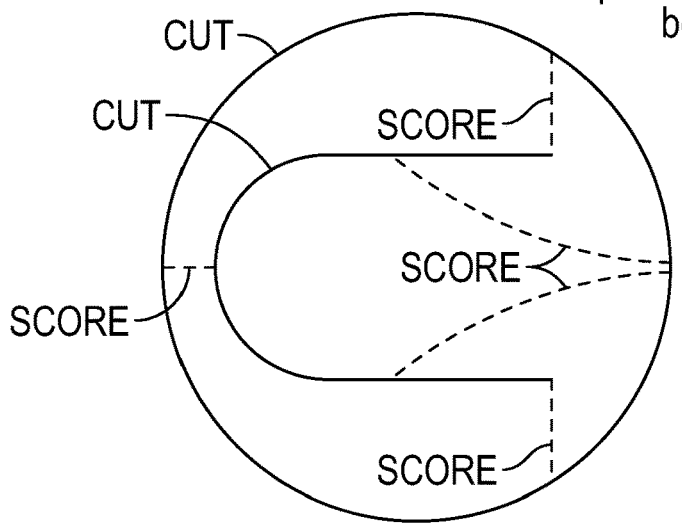
FIG. 5 illustrates a construction sequence for a constructible utensil including an exterior perimeter and a score pattern configured to produce a novel spoon lid utensil.
Figure 5:
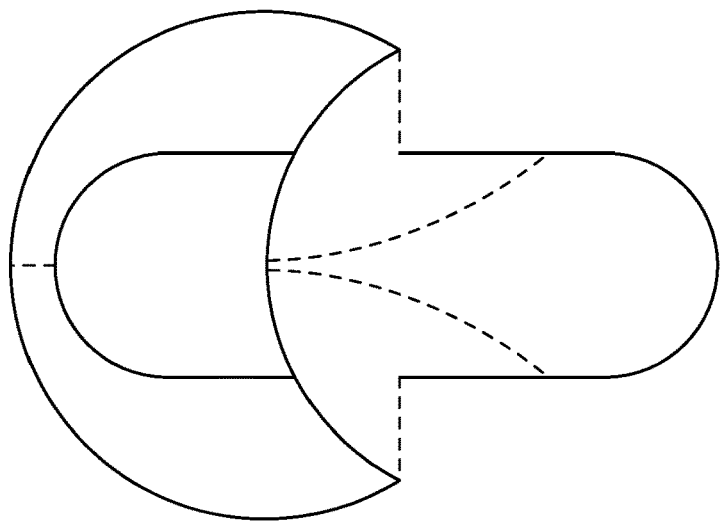
Figure 5:
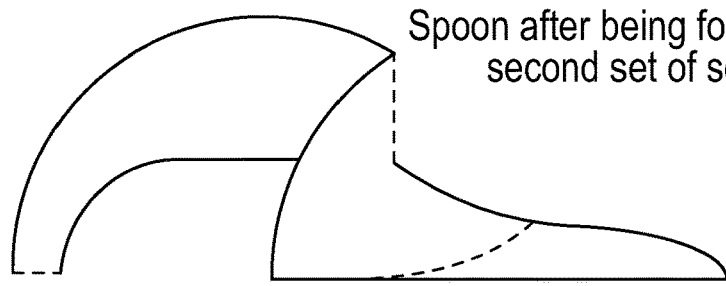

FIG. 5 illustrates a construction sequence for a constructible utensil including an exterior perimeter and a score pattern configured to produce a novel spoon lid utensil. The incorporated patent documents include description and illustrations of several different spoon lids. The products can have a handle portion having a perimeter matching the container opening/lid shape and a functional extension that is foldably attached to the handle portion. Unfolding the functional extension and folding the handle portion creates an extended bowl portion suitable for reaching into the container and consuming the foodstuff contained within. Those solutions offer the advantage of a small pre-constructed footprint with the ability to have a greater length when constructed. In some instances, the folding process increases unit costs due to the folding step and addition of any releasable adhesive securing the functional extension in the folded configuration to be ready for use. And as compared to the constructible utensil illustrated in FIG. 5, such a system includes "extra" material that is not used by the embodiment of FIG. 5.

The constructible utensil of FIG. 5 includes a paperboard (or other suitable foundation material) blank shaped to match the intended packing location (which for this implementation is under a lid to help maintain the constructible utensil in a clean and sanitary condition, but other locations are possible). The perimeter can thus be shaped to match the container mounting/attachment location; frequently it is circular, such as for a yogurt container. Other perimeter shapes are possible and as varied as possible opening shapes.

The desired perimeter shape is cut, and a number of interior scores and cuts are formed within the blank. The cuts form a bullet-shaped functional portion that is hingedly fixed to the interior of the blank. A pair of lateral scores connecting ends of the cut to the exterior form hinges that allow the bullet-shaped functional portion to be displaced from the plane of the blank and rotated 180 degrees about the hinging lateral scores, so the functional portion now extends past the opening-shaped perimeter. Scores on the functional portion include a typical curved score pattern that are symmetric about a fold axis. That fold axis is aligned with a score on the interior portion of the blank, and thus allows the structure to be easily folded about the fold axis to produce a constructed utensil for use with the container. The constructible utensil thus saves material and folding costs as compared to the reference spoonlid system described herein.

Figure 6:
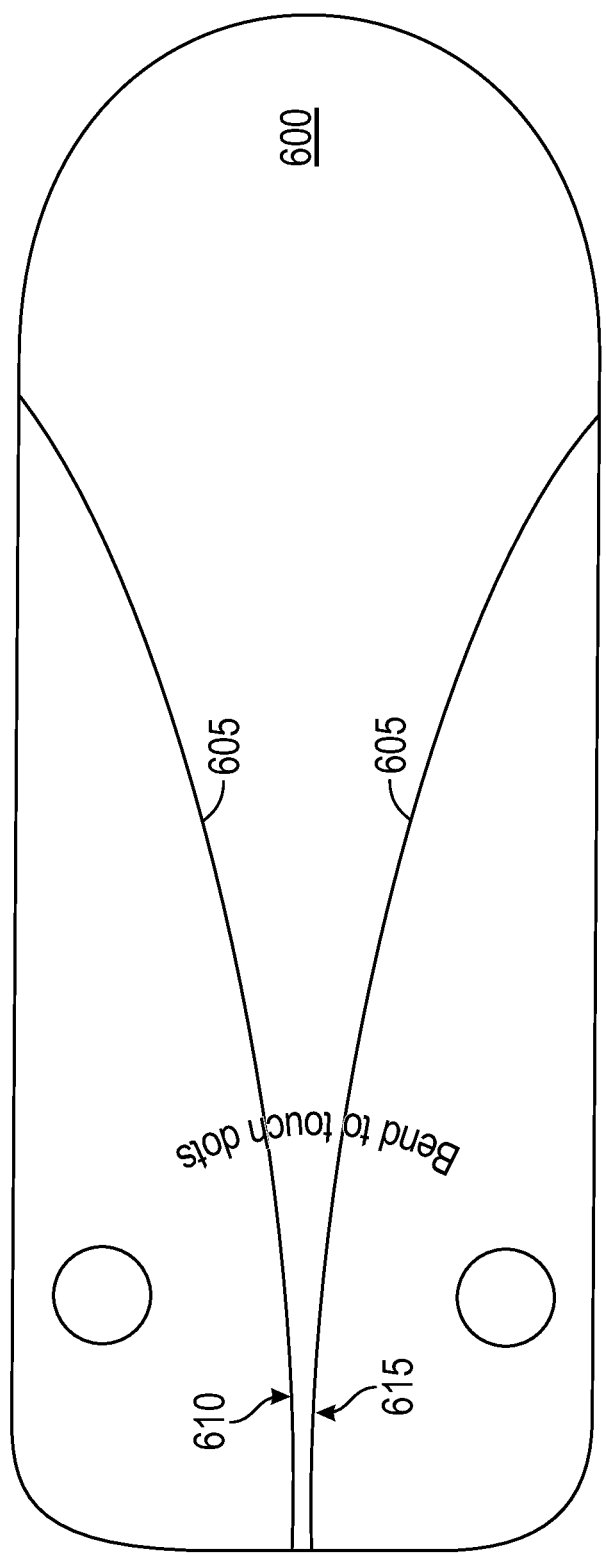
FIG. 6 illustrates an embodiment of the invention in which scores 605 are curved.

FIG. 6 illustrates a constructible utensil 600 including an improved scoring pattern. Utensil 600 includes a pair of scores 605, which may be curved as shown but are not required to be such, that are shaped to converge when moving from a bowl-region towards the handle portion. Scores 605 do not intersect but turn at inflection points 610 in the score pattern. The scores continue from each inflection point 610 and produce parallel linear score portions 615 that extend from inflection points 610 to the rear of the handle region. Linear score portions 615 are, in preferred embodiments, parallel to the longitudinal axis and slightly offset an equal amount. A die to produce the scoring pattern of FIG. 6 is more economical to produce and can provide millions more impressions, which greatly reduces the unit/cost of the constructible utensil. Further, the scoring pattern of FIG. 6 results in a more predictable uniform bending/folding about scores 605 when the handle region is folded about the longitudinal axis.

Figure 7:
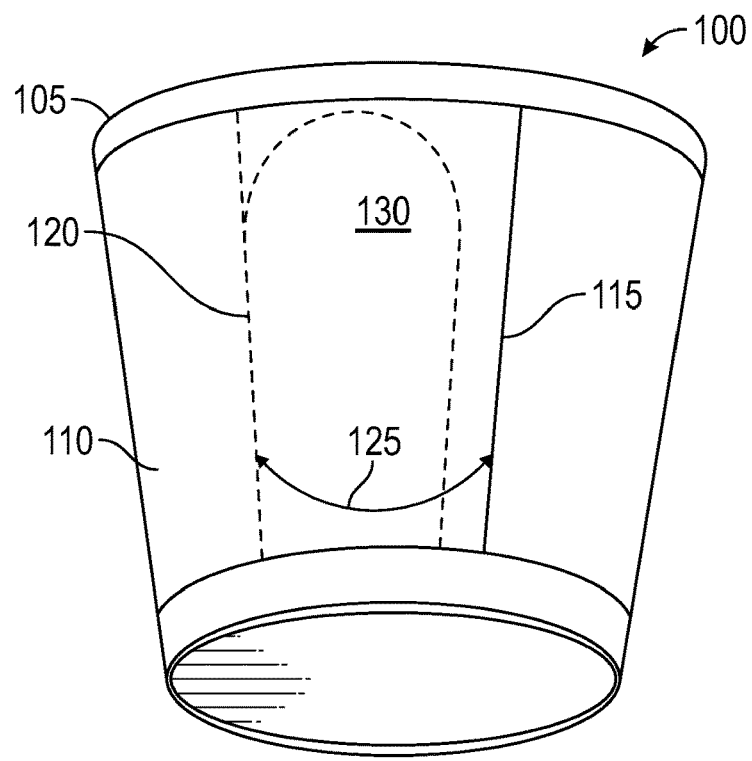
FIG. 7 illustrates a constructible utensil delivery system including a container with an overwrap as delivered to a prospective consumer.
Figure 8:
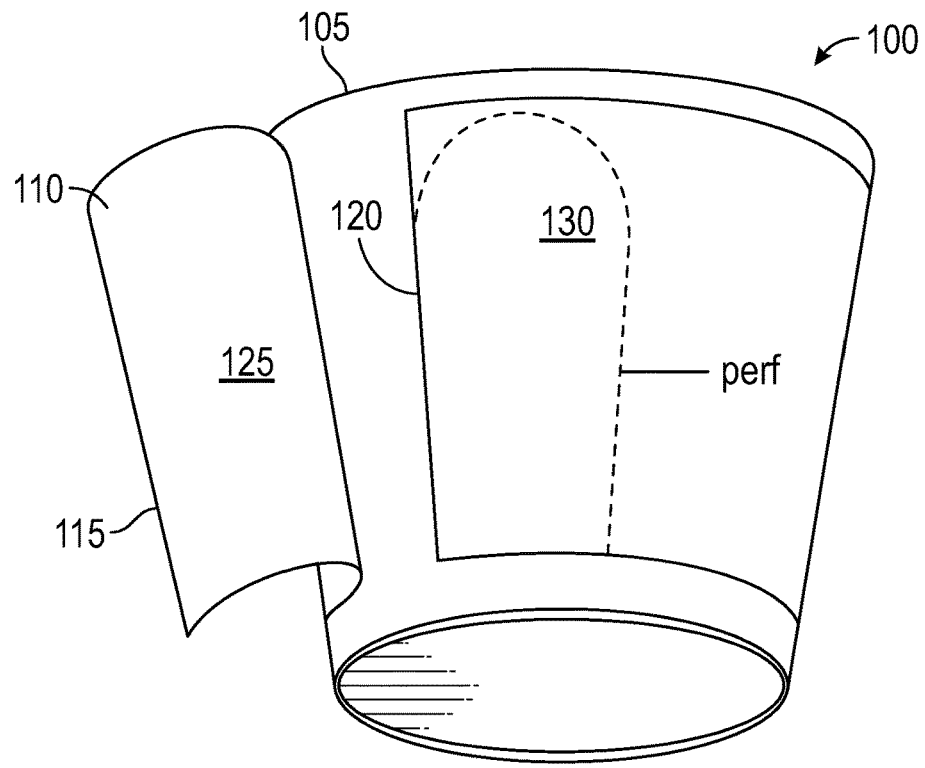
FIG. 8 illustrates the constructible utensil delivery system of FIG. 7 with the overwrap partially pulled back to reveal the integrated constructible utensil.

FIG. 7 illustrates a constructible utensil delivery system 100 including a container 105 with an overwrap 110 as delivered to a prospective consumer. FIG. 8 illustrates constructible utensil delivery system 100 with overwrap 110 partially pulled back to reveal the integrated unconstructed constructible utensil. Container 105 is illustrated as an inverted regular conical frustum having a top opening, a bottom base, and a sidewall extending between the bottom base and the top opening. The sidewall defines a cavity for receipt and storage of a foodstuff, and a lid closes and seals the top opening. Container 105 is often made of a thin-walled plastic material. Container 105 is used in the description of the embodiments of the present invention, it being understood that container 105 may vary greatly in shape, length, height, and width from what is shown. Container 105 may be implemented in other regular and irregular shapes, such as for example a regular or irregular parallelepiped having rectilinear faces. For a food container, typically there is a planar base (e.g., circular, elliptical, square, rectangular, or other regular or irregular polygon having 5-8 sides), and a top opening parallel to the base, with one or more sidewalls extending from the base to the opening defining the cavity.

Overwrap 110 is a stiff yet flexible paperboard material that has the properties required of a constructible utensil (thickness, stiffness, bendability, and the like) to be delivered by constructible utensil delivery system 100. Some implementations may not be paper stock but may be paper-like (e.g., other plant fiber besides tree fiber) or a calcium carbonate or an environmentally friendly suitable material that can be biodegradable and/or compostable, the materials as described in U.S. patent application Ser. No. 13/357,557 filed Jan. 24, 2021, the contents of which are expressly incorporated in their entirety by reference into the present patent application, as mentioned above.

Overwrap 110 is sized and shaped to preferably extend more than once around a container perimeter defined as the collection of all the sidewalls. By extending more than once around the container perimeter, overwrap 110 includes a free end 115 that overlaps a fixed end 120; the magnitude (length) of an overlapping portion 125 may be adjusted as described herein. Overwrap 110 is fixed to an outside exterior of the sidewall in many different ways. For example, fixed end 120 may be adhered to the outside exterior using an adhesive that is semi-tacky or permanent. A permanent adhesive ensures that overwrap 110 remains attached to container 105. A semi-tacky adhesive allows overwrap 110 to be removed after use.

Free end 115 is releasably secured (e.g., to a section of overwrap 110) using a semi-tacky releasable adhesive. The releasable adhesive or other securing mechanism secures free end 115 to overwrap 110 in a way that holds overwrap 110 in place during shipment and distribution yet is releasable to permit free end 115 to be unsealed and opened. Some implementations may further employ a sealed plastic bag or a second level overwrap that is shrink-wrapped or the like to container 105 which secures overwrap 110 in position.

A section of overwrap 110 covered by overlapping portion 125 includes a constructible utensil 130. Constructible utensil 130 is defined in or integrated with the section of overwrap 110 that is covered over by overlapping portion 125. For constructible utensil delivery system 100, constructible utensil 130 is completely covered by overlapping portion 125, which helps maintain it in a sanitary and clean condition to properly be used for serving foodstuff to be eaten.

Constructible utensil 130 has a length and width, the length greater than the width, and with the length equal to or less than a width of overwrap 110. Constructible utensil 130 is disposed vertically (the length extending between the bottom base and the top opening, and the width extending along the container perimeter). In this way, a reduced amount of overwrap 110 may be used (e.g., the length of overwrap 110 may be just sufficient to cover constructible utensil 130 before removal and the width of overwrap 110 is just greater than the length of constructible utensil 130, giving enough perimeter around the utensil to hold it into place).

Constructible utensil 130 is preferably defined in the section of overwrap 110 to be covered up by overlapping portion 125 using a series of perforations or other defined-tear propagation technique that allows a consumer to remove constructible utensil 130 from overwrap 110. That portion of overwrap 110 defining constructible utensil 130 cannot have permanent adhesive (but may use semi-tacky adhesive) holding overwrap 110 to the sidewall, or the consumer would not be able to remove constructible utensil 130. Permanent adhesive would have to be used outside the perimeter of constructible utensil 130. Note that it is preferred, but not required, that free edges of constructible utensil 130 match, or are otherwise preformed by shaping, fixed end 120. Thus, a handle and one lateral edge do not need to be torn or removed to separate constructible utensil 130 from overwrap 110. Other implementations may have a greater extent of perforations extending around a perimeter of constructible utensil 130, requiring more removal time and effort for a consumer, which can risk inadvertent damage to constructible utensil 130 as it is removed.

In operation, the consumer lifts free end 115 and peels overlapping portion 125 off of container 105 to reveal the underlying constructible utensil 130 defined in the revealed portion of overwrap 110. The consumer separates off constructible utensil 130 from overwrap 110 to hold an independent and discrete unconstructed constructible utensil 130 in hand. The consumer, if not having already done so, exposes the foodstuff-containing cavity of container 105 (e.g., removing the lid from the top opening) and constructs constructible utensil 130 to produce a utensil that the consumer then uses to consume the foodstuff from container 105.

Figure 9:
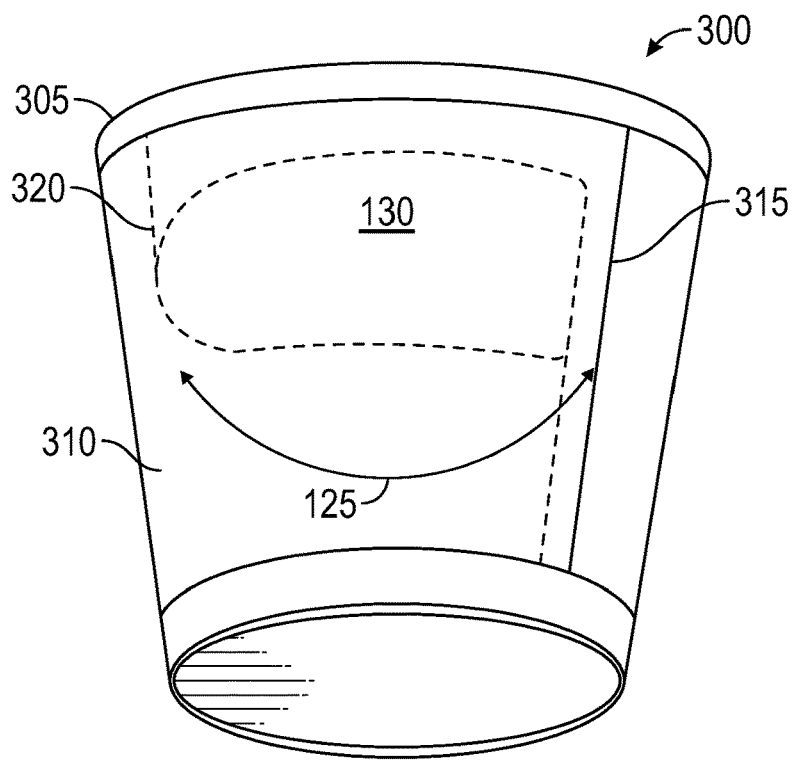
FIG. 9 illustrates a first alternate constructible utensil delivery system including a container with an overwrap as delivered to a prospective consumer.
Figure 10:
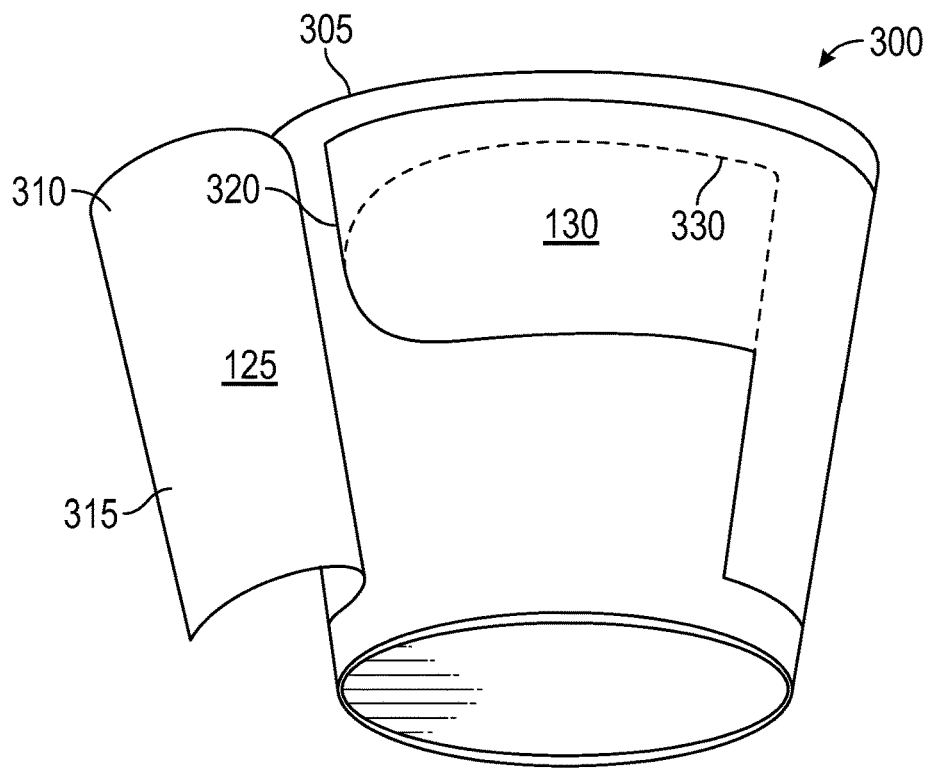
FIG. 10 illustrates the first alternate constructible utensil delivery system of FIG. 9 with the overwrap partially pulled back to reveal the integrated constructible utensil.

FIG. 9 illustrates a first alternate constructible utensil delivery system 300 including a container 305 with an overwrap 310 as delivered to a prospective consumer. FIG. 10 illustrates first alternate constructible utensil delivery system 300 with overwrap 310 partially pulled back to reveal the integrated constructible utensil 130. Except as expressly detailed, or where context clearly requires a different conclusion, components and elements of first alternate constructible utensil delivery system 300 conform to the corresponding components and elements of constructible utensil delivery system 100 described herein. Differences between first alternate constructible utensil delivery system 300 and constructible utensil delivery system 100 include orientation of constructible utensil 130 horizontally (the length extending in the direction of the container perimeter and the width extending between the bottom base and top opening) instead of vertically a free end 315 covering a greater overlapping portion 125 (at least a length of constructible utensil 130 rather than its width) and a fixed end 320 illustrating a utensil definition that can also make it easier for a consumer to identify and access constructible utensil 130 once overlapping portion 125 is peeled away.

As illustrated, fixed end 320 is notched and preformed having portions of free lateral edges of constructible utensil 130 pre-cut and exposed from fixed end 320 and a limited perforation 325 added, which reduces the amount of tearing required to remove. This is consistent with an implementation of constructible utensil delivery system 100 described herein. In some implementations, fixed end 320 is square across its entire width and would require more time and effort to remove, possibly increasing risk of inadvertent damage to constructible utensil 130 during removal.

Figure 11:
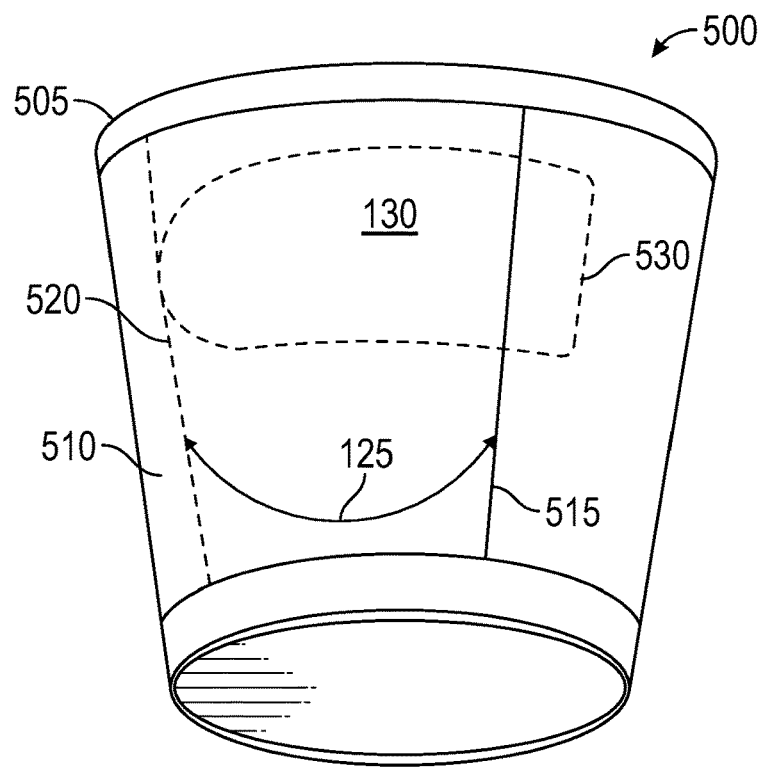
FIG. 11 illustrates a second alternate constructible utensil delivery system including a container with an overwrap as delivered to a prospective consumer.
Figure 12:
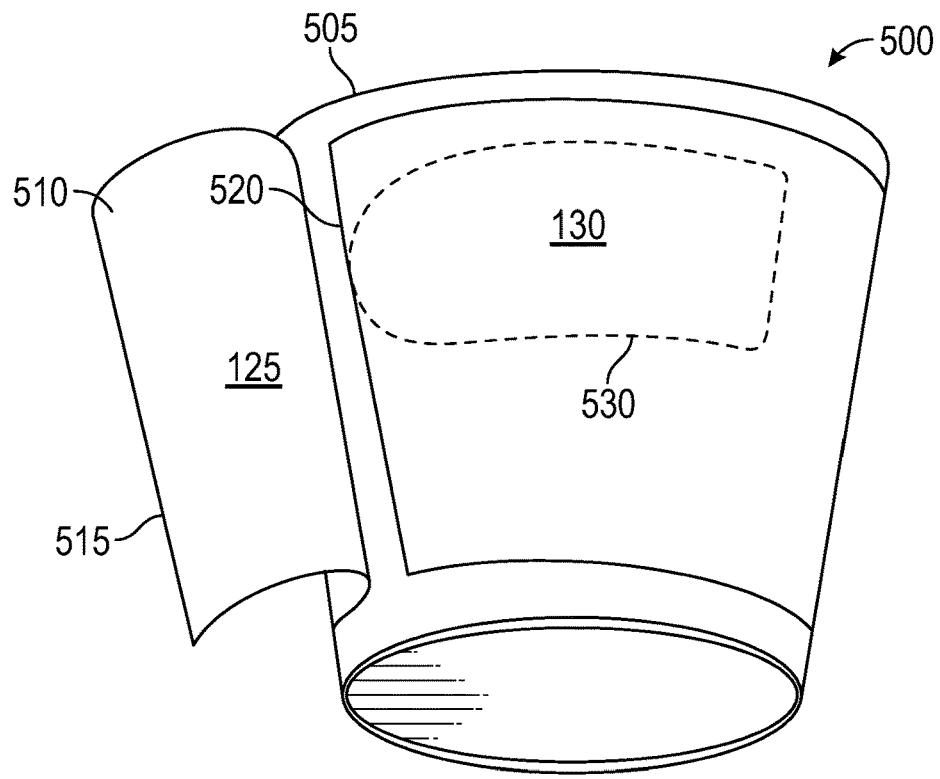
FIG. 12 illustrates the second alternate constructible utensil delivery system of FIG. 11 with the overwrap partially pulled back to reveal the integrated constructible utensil.

There are reasons why a manufacturer may prefer an implementation of first alternate constructible utensil delivery system 300 over constructible utensil delivery system 100. These reasons include a height of container 305 (or a width of overwrap 310 associated with container 305) being less than a desired length of constructible utensil 130, or the manufacturer preferring a horizontal disposition of constructible utensil 130 on container 305 (such to present advertising/marketing copy using overwrap 310 or constructible utensil 130 in a particular way). U.S. patent application Ser. No. 13/797,446 (incorporated by reference into the present patent application as mentioned above), includes alternative shapes for constructible utensil 130, score patterns, and some discussion regarding adjustments of length of a constructible utensil 130 that could impact orientation of the utensil and dimensions of the overwrap, FIG. 11 illustrates a second alternate constructible utensil delivery system 500 including a container 505 with an overwrap 510 as delivered to a prospective consumer. FIG. 12 illustrates second alternate constructible utensil delivery system 500 with overwrap 510 partially pulled back to reveal the integrated constructible utensil.

Except as expressly detailed, or where context clearly requires a different conclusion, components and elements of second alternate constructible utensil delivery system 500 conform to the corresponding components and elements of first alternate constructible utensil delivery system 300 described herein. Differences between second alternate constructible utensil delivery system 500 and first alternate constructible utensil delivery system 300 include a magnitude of overlapping portion 125 (i.e., it covers only a portion of constructible utensil 130, exposing a rear end of the handle portion while sealing and protecting an opposing food-contacting functional end), and fixed end 520 is illustrated completely square and therefore a perforation line 530 extends completely around the utensil perimeter (except in some cases for a very small area where the opposing food-contacting functional end aligns with fixed end 520).

As illustrated, fixed end 520 is NOT notched and preformed. More copy space is provided on overwrap 510 in this configuration (access when free end 515 is peeled away), which may be desirable in that overwrap 510 may be shorter than overwrap 310 for the same container and constructible utensil, as overlapping portion 125 is shorter in second alternate constructible utensil delivery system 500.

There are reasons why a manufacturer may prefer an implementation of second alternate constructible utensil delivery system 500 over constructible utensil delivery system 100 (similar to the reasons of selecting first alternate constructible utensil delivery system 300 over constructible utensil delivery system 100) or over first alternate constructible utensil delivery system 300. These reasons include reducing a manufacturing cost by reducing a length of overwrap 510 as compared to overwrap 310 to partially expose the horizontally disposed integrated constructible utensil 130, and/or improving consumer awareness of the availability of constructible utensil 130 prior to the consumer's purchase of a food container. A consumer unfamiliar with constructible utensil delivery system 100 or first alternate constructible utensil delivery system 300 may not realize that a constructible utensil is available for use and may therefore forego purchase. Second alternate constructible utensil delivery system 500 may address some of those concerns of the consumer without contaminating the food-contacting end. In this sense, partially exposing a vertically disposed constructible utensil is not preferred when the associated container includes foodstuff. However as other contexts exist for a container requiring a dispensing utensil for non-foodstuff contents, in some instances a partially exposed vertically disposed constructible utensil may be implemented without the same concerns about preservation of a sanitary condition for the non-food-contacting portion of constructible utensil 130 (which is the food-contacting portion for foodstuff containers).

In some embodiments, it will be desirable to provide some type of mechanism to maintain the lateral edges of the body (e.g., near the indicia) in a generally folded arrangement to preserve a desired minimum capacity/shape to the formed bowl (and to maintain those lateral edges extending upwards to be easily grasped to permit taster 130 to be picked up from a work surface, especially with the bowl shape retained). The material selection of the body and the depth and nature of the formation of the scores are one way to provide for a retaining force resisting unfolding when a folding force is removed. In other embodiments, some type of tacky adhesive or interconnecting tabs may be used to hold the lateral edges together and the body in the folded mode.

Figure 13:
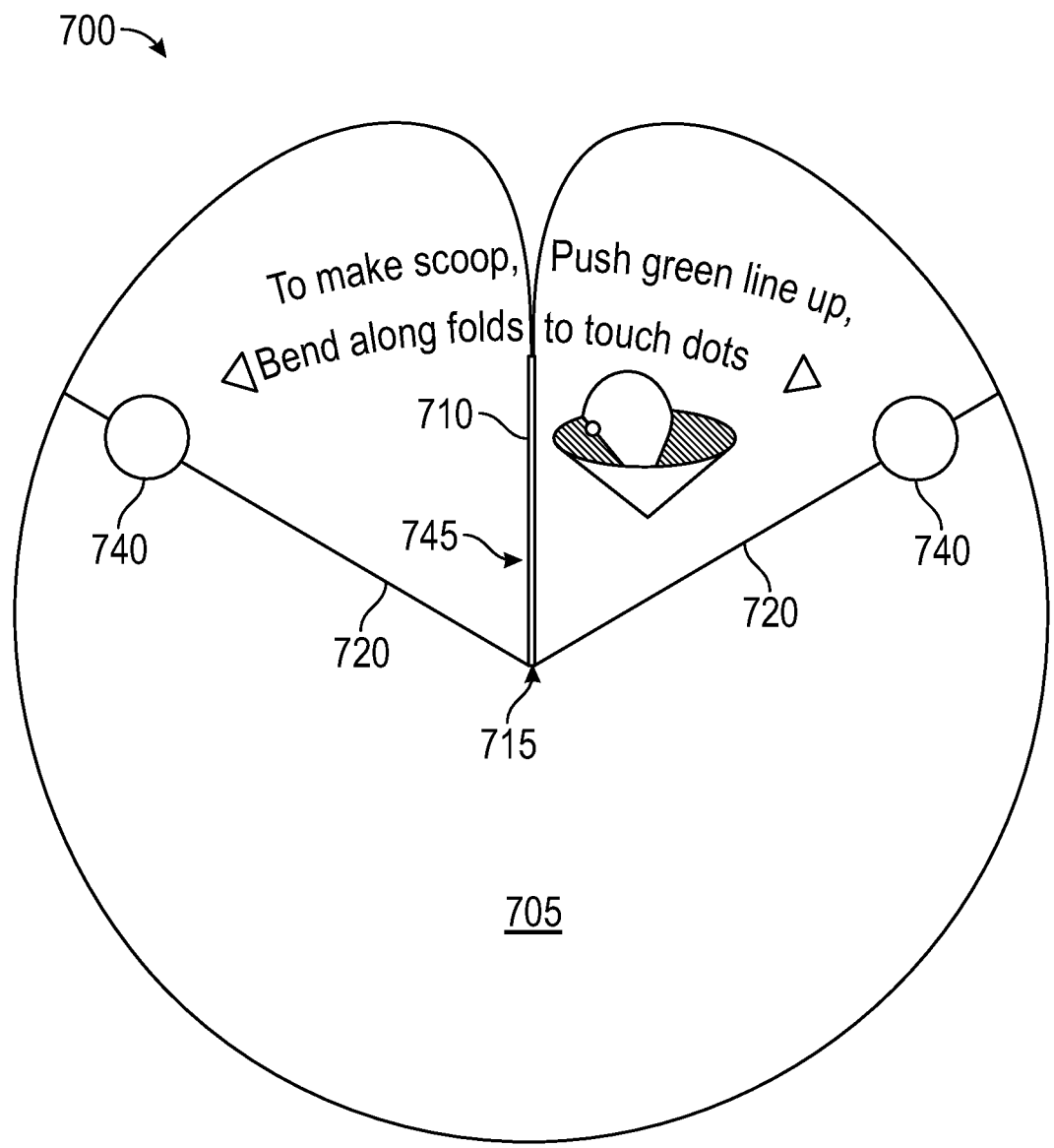
FIG. 13 illustrates a pre-constructed conical constructible scoop.
Figure 14:
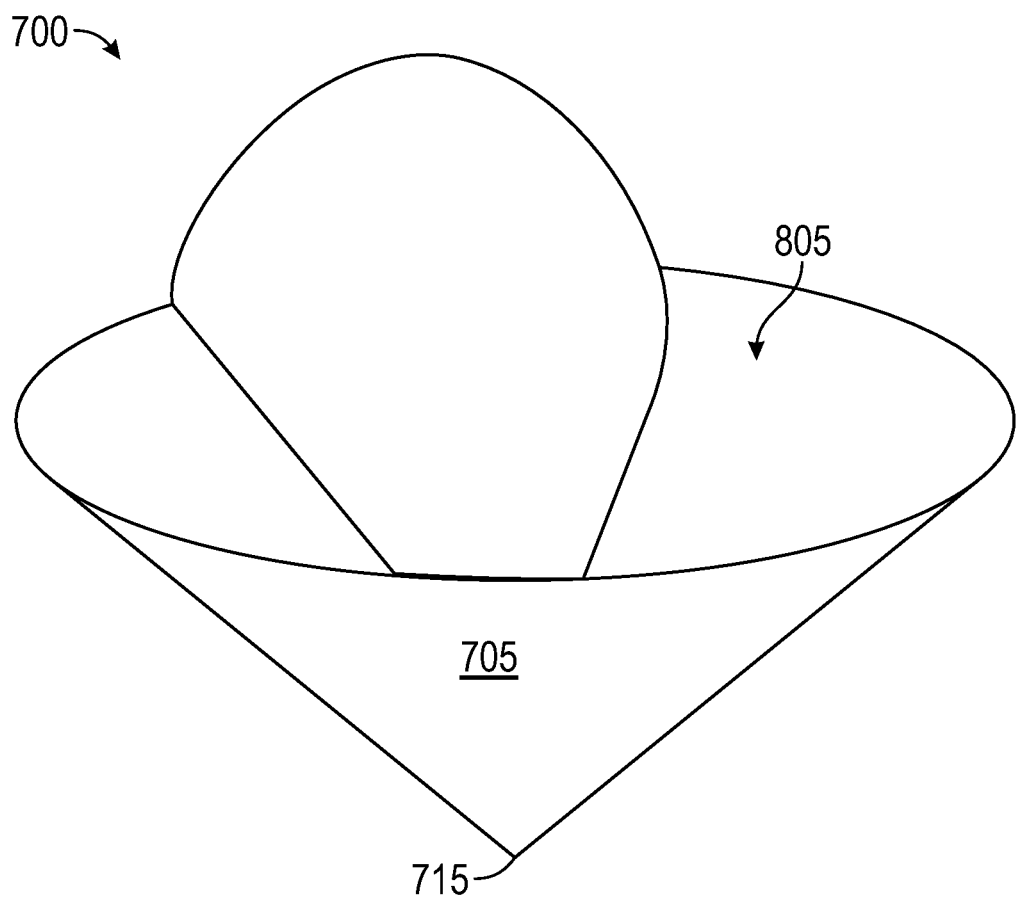
FIG. 14 illustrates a constructed conical constructible scoop corresponding to FIG. 13.

FIG. 13 illustrates a pre-constructed constructible scoop 700, and FIG. 14 illustrates a constructed format for the scoop of FIG. 13. Constructible scoop 700 includes a body 705 that is planar and deformable (e.g., bendable, foldable, and/or otherwise transformable) made from a suitable planar stock. Body 705 includes a handle portion joined to a scoop portion, and a plurality of scores defining the portions and aiding in formation of a handle from the handle portion and a scoop at the scoop portion when constructed. Body 705 is generally circular though some embodiments may be elliptical or ovoid or the like.

The plurality of scores include a diameterial score (i.e., a score positioned along a diameter) 710 extending from a rear edge of the handle portion to a vertex 715. Diameterial score 710 extends along a diameter that divides body 705 into two generally symmetric halves. For other shapes, score 710 will not be a diameter but some other line with symmetry (e.g., a major or minor axis of an elliptical format).

The plurality of scores also include a pair of handle scores 720 that each extend from vertex 715 to an edge of body 705. Handle scores 720 form an angle less than ninety degrees with respect to diameterial score 710. The particular angle formed by these scores is related to the radius and/or length and width of body 705 as well as the placement of vertex 715 along the longitudinal axis. The length and width and placement of vertex 715 affect the defined volume of the constructed scoop made from constructible scoop 700. Note that the indicated score pattern is not necessarily reflective of which side of body 705 supports any given score. For example, different implementations may provide for any particular score to fold upwardly or downwardly (as seen from a top view such as FIG. 13). And in some cases, irrespective of which "direction" any particular score folds, bends, or transforms, a score, deboss, pattern, or the like may be on either side of body 705. (That is, it is not necessary that a "top" score requires that body 705 must fold either particular direction, but any given implementation typically has a preference for fold directions of the score patterns as implemented, in order to produce a desired configuration for the constructed utensil or implement or device.

In addition to the plurality of scores, body 705 is preferably provided with one or more optional volume indicators and/or corresponding volumetric labels for a closed volume 805 (closed in this context means closed at the bottom and sides with a top opening). Volume indicators provide a user with a visual calibration (which may be approximate) of a volume of material disposed in the scoop of a constructed scoop as shown in FIG. 14 when the material fills the scoop portion to any particular indicator. A top lateral edge of the scoop portion may be one such indicator.

The handle portion also includes a pair of construction indicia 740 (e.g., the pair of "bend-to-touch dots") and a colored score identifier 745. These indicia visually guide the user on how to manipulate body 705 to construct the scoop. The indicated action, in cooperation with the arrangement of the plurality of scores, initiates the constructing action to produce the final result, Note that "bend-to-touch" may in some instances be an indication to touch a "backside" of the dots together, such as when score 710 lifts relative to the lateral edges so the lateral edges move below score 710. Formation of the score pattern and particularly longitudinal score 710 to have a predisposition to folding in an appropriate and particular direction aids in any disambiguation as to which side of the dots are to be touched. In some cases, additional instructions may be useful and/or necessary to indicate to a user how to manipulate body 705. For example, the instruction text refers to a "green line" which references colored (i.e., "green", though any distinguishing color or pattern may be used) score identifier 745. In this case, score 710, identified by colored score indicator 745, is pushed "up" to bring back sides of construction indicia 40 into contact.

In operation, body 705 is manipulated by bending, folding, and the like about the score pattern in order to touch the backsides of construction indicia 740. This action propagates bending, folding, and transformation forces along the score pattern so that vertex 715 "sinks" relative to the lateral edges to form closed volume 805. The scoop is completely constructed when the dots are touched; however, a partially constructed scoop may be useful in some contexts. The user grips the handle (formed from the handle portion) and operates the scoop to capture a desired quantity of material within closed volume 805.

In some embodiments, a tacky adhesive or other connection mechanism may be disposed on the backsides of the dots to maintain the scoop in the constructed mode. The connection mechanism may be temporary, allowing for deconstruction and flattening; or permanent to maintain the scoop in the constructed mode between uses and after the user releases the handle portion.

Figure 17A:
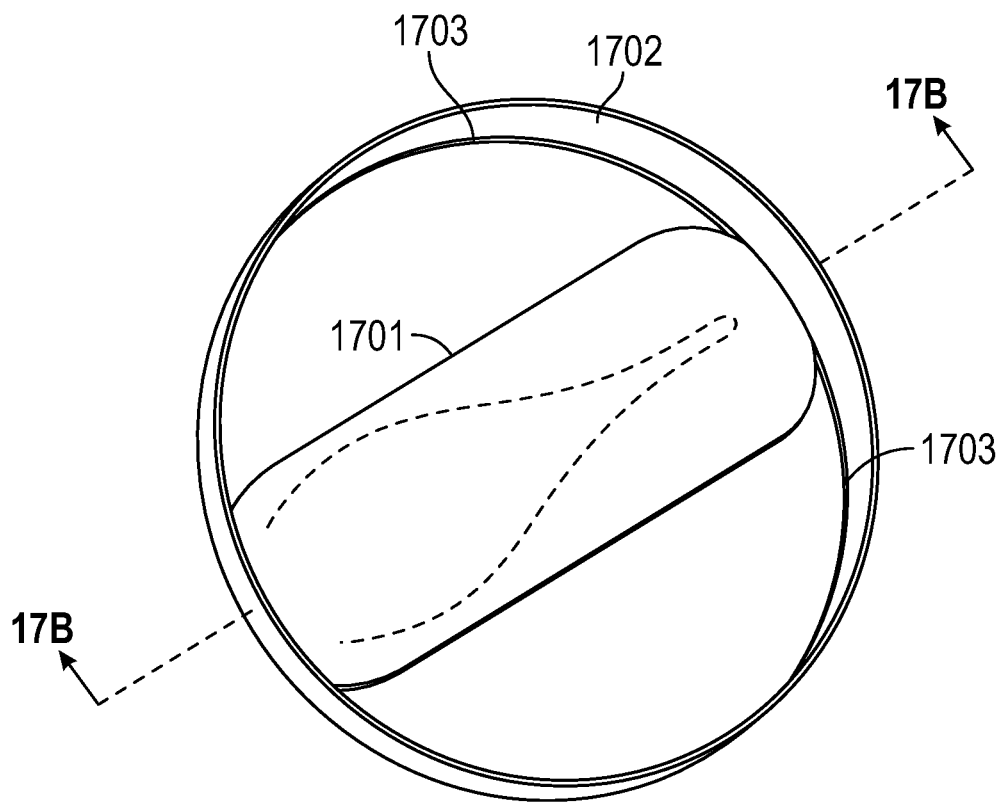
FIG. 17A is a perspective view of an embodiment of the invention in which a utensil 1701 fits snugly into the lid 1702 of a food container.
Figure 17B:
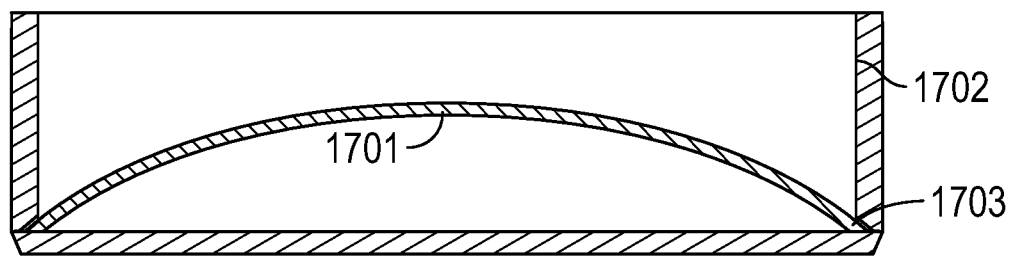
FIG. 17B is a side view of the embodiment of FIG. 17A taken along view lines 17B-17B.

FIGS. 17A and 17B describe an embodiment of the invention in which a utensil 1701 fits snugly into a lid 1702, e.g., a lid of a food container. Utensil 1701 can be any one of the types of utensils described elsewhere in this patent application. In the particular embodiment shown in FIGS. 17A and 17B, utensil 1701 has two generally symmetrical inwardly curving scores in a section of utensil 1701 that will become a bowl portion when a user folds the utensil 1701 about these scores. This inwardly curving arrangement of scores usually makes for a stronger bowl when compared with other score arrangements. Another way of describing the inwardly curving scores is to note that the scores are convex with respect to the elongated horizontal midline of utensil 1701.

Both ends of utensil 1701 fit snugly into a groove 1703 that is formed at the bottom of circumferential wall of lid 1702. In the illustrated embodiment, the wall surrounds a flat circular end plate of lid 1702, but other geometries of the end plate work equally well. For example, the end plate can have a rectangular shape, a pentagonal shape, a trapezoidal shape, an elliptical shape, etc. The wall of lid 1702 can be generally perpendicular to the end plate, but other geometries are possible, i.e., the wall can make other than a 90 degree angle with respect to the end plate.

FIG. 17B is a side view of the FIG. 17A embodiment taken along view lines 17B-17B. It shows that utensil 1701 has a bowed (arcuate) shape. In other words, utensil 1701 is convex with respect to the end plate. The purpose of the arcuate bow is to facilitate a more secure fit between utensil 1701 and groove 1703. If utensil 1701 were placed flat against the end plate, utensil might 1701 have a tendency to slide around within lid 1702. In other embodiments, however, sliding is not an issue, and it is perfectly acceptable for utensil 1701 to lie flat against the end plate.

Figure 18:
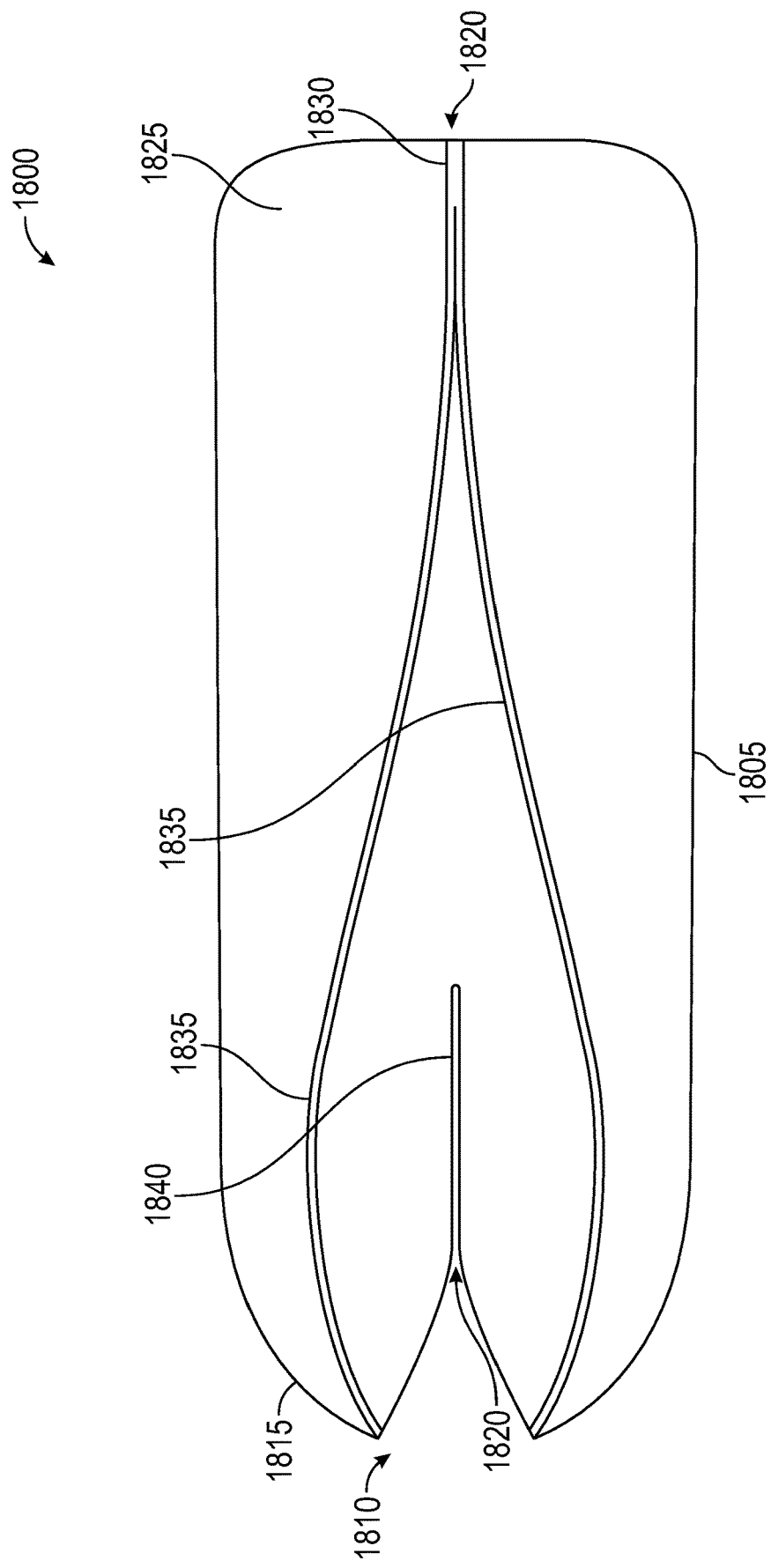
FIG. 18 illustrates an embodiment of the utensil element 1800 of the present invention having inwardly curving (convex with respect to midline 1820) scores 1835.
Figure 19:
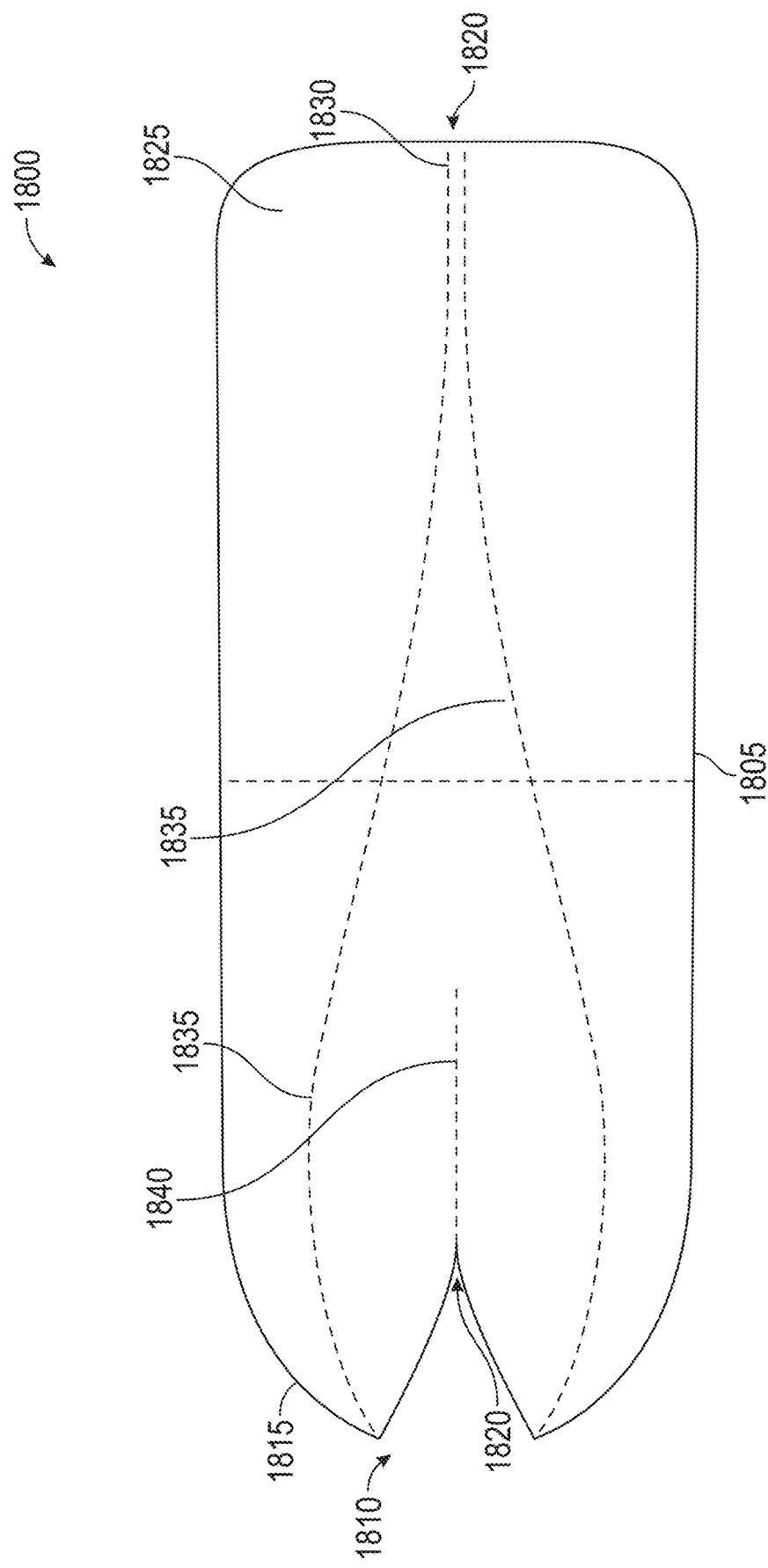
FIG. 19 is a top view of a planar utensil element of the present invention in which a pair of outwardly then inwardly curving scores crosses a perpendicular score.

FIG. 18 is a plan view of an alternate embodiment of a constructible utensil 1800. For certain foodstuffs, a generally "pronged" or "tined" functional element having sufficient strength is desired. Thus, utensil 1800 is shown as having prongs/tines 1815. Also, inwardly curving scores 1835 are used in the FIG. 18 embodiment. Scores 1835 generally make for a stronger bowl portion of utensil 1800 once utensil 1800 has been folded.

Utensil 1800 includes a blunted generally "bullet shaped" perimeter 1805, with a notch provided in a blunted end 1810 forming a pair of prongs/tines 1815. Utensil 1800 has a longitudinal axis 1820 about which utensil 1800 is generally symmetric. A handle portion 1825 is seamlessly joined to blunted end 1810, with handle portion 1825 including an axial handle score 1830 that lies along axis 1820 and bifurcates into a pair of inwardly curving scores 1835. The inwardly curving scores 1835 are by definition convex with respect to longitudinal midline 1820. Scores 1835 are generally symmetric about axis 1820, and extend from handle score 1830 to the general vicinity of the tips of prongs/tines 1815. Utensil 1800 also includes a prong score 1840 extending from the notch along said axis 1820 back towards handle portion 1825. In some embodiments, handle score 1830 may be omitted, its function provided by an extension of one or more of the inwardly curving scores 1835 extending back towards the end of handle portion 1825.

Folding the utensil 1800 about the scores 1835, 1840, 1830 forms a bowl portion coupled to the handle portion 1825. The bowl portion comprises a pair of three-dimensional prong/tine-line structures (each generally describable as "arched"), which adds strength/rigidity and function to the flat manifestation of each prong/tine 1815.

Utensil 1800, like the other constructible utensils described in this patent application, may include informational indicia (e.g., specifically positioned dots) that identify a preferred location for squeezing/deforming handle portion 1825, e.g., a "bend to touch dots" embodiment that guides the user to the desired deformation in the handle 1825 to help optimize formation of the bowl (and the formation of the prongs/tines 1815 in those embodiments where prongs/tines 1815 are present).

Variations of utensil 1800 include terminating the scores 1830, 1835 (particularly the inwardly curving scores 1835) before the scores 1830, 1835 reach the physical edge of utensil 1800. This has an effect of making the folded utensil 1800 have less sharp edges, which better protects the mouth of a user eating from the folded utensil 1800. Additional variations within the scope of the present invention include adjusting the radius of curvature of the inwardly curving scores 1835, which helps define the degree of strength of the utensil 1800 post-folding. The length and width of the handle portion 1825 can also be varied.

The system and methods above have been described in general terms as an aid to understanding details of preferred embodiments of the present invention. In the description herein, numerous specific details are provided, such as examples of components and/or methods, to provide a thorough understanding of embodiments of the present invention. Some features and benefits of the present invention are realized in such modes and are not required in every case. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. The scope of the invention is to be determined solely by the following claims:

The invention claimed is:

1. A planar utensil element fabricated of a foldable material, and having a length greater than a width, comprising:
   first and second scores positioned generally symmetrically about a longitudinal midline running along the length of the element, and indicative of where the element is to be folded in order to become a usable utensil; and
   a third score, generally perpendicular to the first and second scores, traversing the width of the element; wherein:
   the first and second scores each curve outwardly away from the longitudinal midline in a concave manner with respect to the longitudinal midline, and then curve inwardly towards the longitudinal midline in a convex manner with respect to the longitudinal midline as the utensil element is traversed from a handle end to a bowl end;
   ends of the first and second scores are spaced from one another at the bowl end;
   folding the element about the first and second scores produces a handle and a bowl; and
   folding the element 180° about the third score temporarily shortens the length of the element prior to the element becoming a usable utensil.

2. The planar utensil element of claim 1 wherein the first and second scores converge into a straight section of score at the handle end.

3. The planar utensil element of claim 1 wherein the first and second scores each extend to an edge of the bowl end.

4. The planar utensil element of claim 1 wherein the first and second scores each extend to a region proximate to, but not at, an edge of the bowl end.

5. The planar utensil element of claim 1 wherein at least one of the first and second scores traverses the third score.

6. The planar utensil element of claim 1 wherein an edge of the bowl end is serrated to form at least one tine.

7. The planar utensil element of claim 1 wherein the bowl end is wider than a region of the element where the bowl end merges into the handle end.

8. The planar utensil element of claim 1 wherein the handle end is narrower than the bowl end.

9. The planar utensil element of claim 1 wherein the handle end comprises a backstop score formed generally perpendicular to the longitudinal midline.

10. The planar utensil element of claim 1 wherein, subsequent to folding the element 180° about the third score, the element comprises first and second sections held in place to each other by first and second interconnecting members.

11. The planar utensil element of claim 10 wherein the first interconnecting member comprises a tab, and the second interconnecting member fits under the tab.

12. The planar utensil element of claim 1 wherein the first and second scores merge respectively into a pair of straight parallel scores at the handle end.

13. The planar utensil element of claim 1 having a pair of slightly curved elongated edges roughly parallel to the longitudinal midline, wherein each elongated edge is slightly concave with respect to the horizontal midline.

* * * * *